United States Patent
Dutta

(10) Patent No.: US 12,339,780 B2
(45) Date of Patent: Jun. 24, 2025

(54) MULTI-MODE INDEXED CACHE IN A PROCESSOR

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 166 days.

(21) Appl. No.: 18/097,421

(22) Filed: Jan. 16, 2023

(65) Prior Publication Data
US 2024/0241832 A1    Jul. 18, 2024

(51) Int. Cl.
*G06F 12/0864* (2016.01)
*G06F 12/0895* (2016.01)

(52) U.S. Cl.
CPC ...... *G06F 12/0864* (2013.01); *G06F 12/0895* (2013.01)

(58) Field of Classification Search
None
See application file for complete search history.

(56) References Cited

U.S. PATENT DOCUMENTS

| 2010/0049953 | A1 | 2/2010 | Mylavarapu |
| 2016/0350229 | A1* | 12/2016 | Reed ............... G06F 12/126 |
| 2021/0318958 | A1* | 10/2021 | Pawlowski ......... G06F 13/1689 |
| 2022/0309002 | A1* | 9/2022 | Yang ............... G06F 12/0811 |

FOREIGN PATENT DOCUMENTS

| EP | 0977123 A2 | 2/2000 |
| EP | 3055774 B1 | 7/2019 |

OTHER PUBLICATIONS

Extended European Search Report, Application No. 23217405.2-1218, dated May 22, 2024; pp. (11).

* cited by examiner

*Primary Examiner* — Sanjiv Shah
*Assistant Examiner* — Alexander J Yoon
(74) *Attorney, Agent, or Firm* — Tong, Rea, Bentley & Kim, LLC

(57) ABSTRACT

Various example embodiments for supporting processor capabilities are presented herein. Various example embodiments for supporting processor capabilities may be configured to support a multi-mode indexed cache for a processor. Various example embodiments for supporting a multi-mode indexed cache for a processor may be configured to support a multi-mode indexed cache configured as a set associative cache having a plurality of sets, where the cache is configured to support multiple indexing modes for indexing memory blocks such that, for a memory operation for a memory block, the multiple indexing modes are configured to cause selection of different ones of the plurality of sets of the cache for the memory operation for the given memory block.

22 Claims, 23 Drawing Sheets

SET ASSOCIATIVE CACHE 700

| SET | WAY-1 | WAY-2 | WAY-3 | WAY-4 |
|---|---|---|---|---|
| 1 | EMPTY | T=10110 | EMPTY | EMPTY |
| ... | | | | |
| 22 | T=11011 | EMPTY | EMPTY | T=00010 |
| ... | | | | |
| 26 | T=11101 | T=00101 | T=10101 | T=01010 |
| .. | | | | |

| SET | WAY-5 | WAY-6 | WAY-7 | WAY-8 |
|---|---|---|---|---|
| 1 | EMPTY | EMPTY | T=01101 | EMPTY |
| ... | | | | |
| 22 | T=00101 | T=11110 | T=10101 | T=00001 |
| ... | | | | |
| 26 | T=11011 | T=10110 | T=11110 | T=00001 |
| .. | | | | |

FIG. 9

MEMORY
ADDRESS
PARTITIONING
900

| TAG(11-15) | INDEX(6-10) | OFFSET (0-5) |
|---|---|---|
| 10110 | 11010 | 010101 |

FIG. 10

MULTI-MODE INDEXED CACHE STATE 1000

| MFU RECORD | |
|---|---|
| M=1 | HITS=20 |
| M=2 | HITS=10 |

| SET | WAY-1 | WAY-2 | WAY-3 | WAY-4 |
|---|---|---|---|---|
| 1 | | | | |
| ... | | | | |
| 22 | M=2, T=11011 | EMPTY | EMPTY | M=1, T=00010 |
| ... | | | | |
| 26 | M=1, T=11101 | M=1, T=00101 | M=2, T=10101 | M=1, T=01010 |
| .. | | | | |

| SET | WAY-5 | WAY-6 | WAY-7 | WAY-8 |
|---|---|---|---|---|
| 1 | | | | |
| ... | | | | |
| 22 | M=1, T=00101 | M=1, T=11110 | M=2, T=10101 | M=1, T=00001 |
| ... | | | | |
| 26 | M=2, T=11011 | M=2, T=10110 | M=1, T=11110 | M=1, T=00001 |
| .. | | | | |

FIG. 11

MEMORY ADDRESS PARTITIONING
1100

| INDEX(11-15) | TAG(6-10) | OFFSET (0-5) |
|---|---|---|
| 10110 | 11010 | 010101 |

FIG. 12

MULTI-MODE INDEXED CACHE STATE 1200

| MFU RECORD | |
|---|---|
| M=1 | HITS=20 |
| M=2 | HITS=11 |

| SET | WAY-1 | WAY-2 | WAY-3 | WAY-4 |
|---|---|---|---|---|
| 1 | | | | |
| ... | | | | |
| 22 | M=2, T=11011 | M=2, T=11010 | EMPTY | M=1, T=00010 |
| ... | | | | |
| 26 | M=1, T=11101 | M=1, T=00101 | M=2, T=10101 | M=1, T=01010 |
| .. | | | | |

| SET | WAY-5 | WAY-6 | WAY-7 | WAY-8 |
|---|---|---|---|---|
| 1 | | | | |
| ... | | | | |
| 22 | M=1, T=00101 | M=1, T=11110 | M=2, T=10101 | M=1, T=00001 |
| ... | | | | |
| 26 | M=2, T=11011 | M=2, T=10110 | M=1, T=11110 | M=1, T=00001 |
| .. | | | | |

CON'T

FIG. 14 CON'T
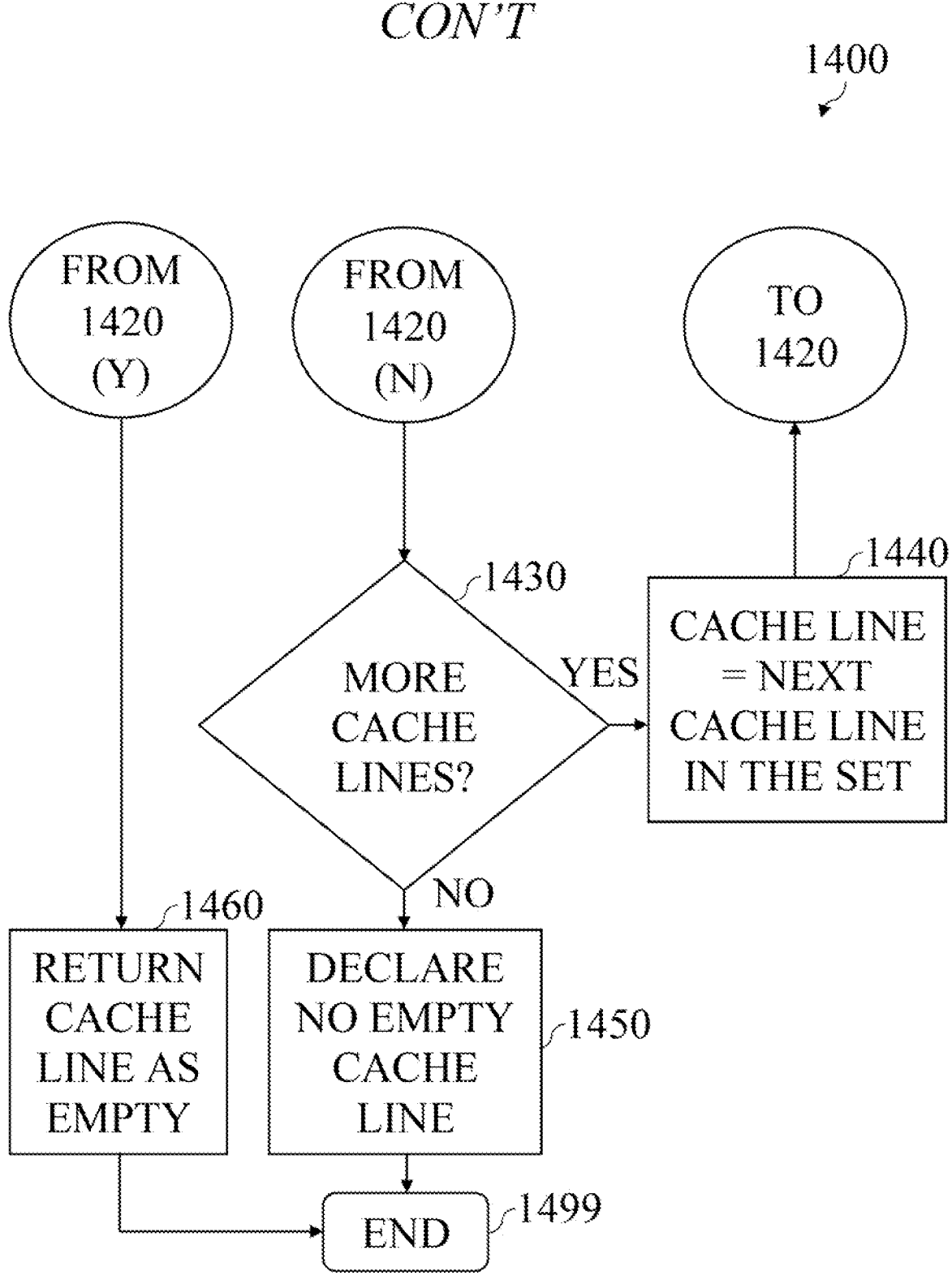

CON'T

CON'T

MULTI-MODE INDEXED CACHE IN A PROCESSOR

TECHNICAL FIELD

Various example embodiments relate generally to computer systems and, more particularly but not exclusively, to caches associated with processors of computer systems.

BACKGROUND

Computer systems utilize various types of processors to perform various functions in various contexts. Processors utilize various types of caches to perform various functions in various contexts.

SUMMARY

In at least some example embodiments, an apparatus includes a cache configured as a set associative cache having a plurality of sets, wherein the cache is configured to support multiple indexing modes for indexing memory blocks such that, for a memory operation for a given memory block, the multiple indexing modes are configured to cause selection of different ones of the plurality of sets of the cache for the memory operation for the given memory block. In at least some example embodiments, the multiple indexing modes use different subsets of bits of a memory block address of the given memory block to select the different ones of the plurality of sets of the cache for the memory operation for the given memory block. In at least some example embodiments, the different subsets of bits of the memory block address of the given memory block are disjoint subsets of bits of the memory block address of the given memory block. In at least some example embodiments, the given memory block has a memory block address associated therewith, the memory block address includes a first set of bits and a second set of bits, and a first indexing mode of the multiple indexing modes uses the first set of bits to index into the plurality of sets of the cache and a second indexing mode of the multiple indexing modes uses the second set of bits to index into the plurality of sets of the cache. In at least some example embodiments, the memory block address includes a third set of bits, and the third set of bits is an offset into a cache line within a selected one of the plurality of sets of the cache. In at least some example embodiments, the cache is configured as an N-way set associative cache having N ways, the given memory block has a memory block address associated therewith, the memory block address includes a first set of bits and a second set of bits, a first indexing mode of the multiple indexing modes uses a first subset of bits from the first set of bits to index into the plurality of sets of the cache and a second indexing mode of the multiple indexing modes uses a second subset of bits from first set of bits to index into the plurality of sets of the cache, and the second set of bits is used to identify one of the N ways within a selected one of the plurality of sets of the cache. In at least some example embodiments, the cache is configured to select, from the multiple indexing modes, a first indexing mode for the memory operation for the given memory block, and select, from the multiple indexing modes based on a determination that the memory operation for the given memory block is not completed using the first indexing mode, a second indexing mode for the memory operation for the given memory block. In at least some example embodiments, the cache is configured to select, from the multiple indexing modes for the given memory block, a selected indexing mode, select, based on the selected indexing mode, a selected one of the plurality of sets of the cache, and perform, based on the selected one of the plurality of sets of the cache, the memory operation for the given memory block. In at least some example embodiments, the memory operation is a write operation, and the selected indexing mode is selected from the multiple indexing modes randomly or in a round robin manner. In at least some example embodiments, the memory operation is a read operation, and the selected indexing mode is a most frequently used indexing mode of the multiple indexing modes. In at least some example embodiments, the most frequently used indexing mode of the multiple indexing modes is determined based on metadata indicative of respective frequencies with which the multiple indexing modes have been used for writing into the cache. In at least some example embodiments, the memory operation is a write operation and, to perform the write operation for the given memory block, the cache is configured to store, in a cache line of the selected one of the plurality of sets of the cache based on a determination that the cache line of the selected one of the plurality of sets of the cache is empty, the memory block. In at least some example embodiments, the cache is configured to store, within metadata of the cache, an indication of the selected indexing mode. In at least some example embodiments, the memory operation is a write operation and, to perform the write operation for the given memory block, the cache is configured to select, from the multiple indexing modes based on a determination that the selected one of the plurality of sets of the cache does not include an empty cache line, a next selected indexing mode, select, based on the next selected indexing mode, a next selected one of the plurality of sets of the cache, and perform, based on the next selected one of the plurality of sets of the cache, the write operation for the given memory block. In at least some example embodiments, the memory operation is a write operation and, to perform the write operation for the given memory block, the cache is configured to determine, from the multiple indexing modes based on a determination that the selected one of the plurality of sets of the cache does not include an empty cache line, whether each of the multiple indexing modes has been selected for attempting to write the memory block into the cache, evict, from the selected one of the plurality of sets of the cache based on a determination that each of the multiple indexing modes has been selected for attempting to write the memory block into the cache, a cache line, and store, in the cache line, the memory block. In at least some example embodiments, the memory operation is a read operation and, to perform the read operation for the given memory block, the cache is configured to perform, in the selected one of the plurality of sets of the cache, a lookup for a matching cache line and declare, based on a determination that the selected one of the plurality of sets of the cache includes a matching cache line, a hit for the memory block in the selected one of the plurality of sets of the cache. In at least some example embodiments, the memory operation is a read operation and, to perform the read operation for the given memory block, the cache is configured to select, from the multiple indexing modes based on a determination that a matching cache line is not found in the selected one of the plurality of sets of the cache, a next selected indexing mode, select, based on the next selected indexing mode, a next selected one of the plurality of sets of the cache, and perform, based on the next selected one of the plurality of sets of the cache, the read operation for the given memory block.

In at least some example embodiments, the memory operation is a read operation and, to perform the read operation for the given memory block, the cache is configured to determine, from the multiple indexing modes based on a determination that a matching cache line is not found in the selected one of the plurality of sets of the cache, whether each of the multiple indexing modes has been selected for attempting to read the memory block from the cache and declare, based on a determination that each of the multiple indexing modes has been selected for attempting to read the memory block from the cache, a miss for the memory block in the cache. In at least some example embodiments, the cache includes an instruction cache, a micro-operations cache, a data cache, a unified cache, or a branch target buffer. In at least some example embodiments, the apparatus includes a processor, and the processor is configured to initiate the memory operation for the given memory block.

In at least some example embodiments, a non-transitory computer readable medium includes program instructions that, when executed by an apparatus, cause the apparatus at least to operate a cache configured as a set associative cache having a plurality of sets, wherein the cache is configured to support multiple indexing modes for indexing memory blocks such that, for a memory operation for a given memory block, the multiple indexing modes are configured to cause selection of different ones of the plurality of sets of the cache for the memory operation for the given memory block. In at least some example embodiments, the multiple indexing modes use different subsets of bits of a memory block address of the given memory block to select the different ones of the plurality of sets of the cache for the memory operation for the given memory block. In at least some example embodiments, the different subsets of bits of the memory block address of the given memory block are disjoint subsets of bits of the memory block address of the given memory block. In at least some example embodiments, the given memory block has a memory block address associated therewith, the memory block address includes a first set of bits and a second set of bits, and a first indexing mode of the multiple indexing modes uses the first set of bits to index into the plurality of sets of the cache and a second indexing mode of the multiple indexing modes uses the second set of bits to index into the plurality of sets of the cache. In at least some example embodiments, the memory block address includes a third set of bits, and the third set of bits is an offset into a cache line within a selected one of the plurality of sets of the cache. In at least some example embodiments, the cache is configured as an N-way set associative cache having N ways, the given memory block has a memory block address associated therewith, the memory block address includes a first set of bits and a second set of bits, a first indexing mode of the multiple indexing modes uses a first subset of bits from the first set of bits to index into the plurality of sets of the cache and a second indexing mode of the multiple indexing modes uses a second subset of bits from first set of bits to index into the plurality of sets of the cache, and the second set of bits is used to identify one of the N ways within a selected one of the plurality of sets of the cache. In at least some example embodiments, the cache is configured to select, from the multiple indexing modes, a first indexing mode for the memory operation for the given memory block, and select, from the multiple indexing modes based on a determination that the memory operation for the given memory block is not completed using the first indexing mode, a second indexing mode for the memory operation for the given memory block.

In at least some example embodiments, the cache is configured to select, from the multiple indexing modes for the given memory block, a selected indexing mode, select, based on the selected indexing mode, a selected one of the plurality of sets of the cache, and perform, based on the selected one of the plurality of sets of the cache, the memory operation for the given memory block. In at least some example embodiments, the memory operation is a write operation, and the selected indexing mode is selected from the multiple indexing modes randomly or in a round robin manner. In at least some example embodiments, the memory operation is a read operation, and the selected indexing mode is a most frequently used indexing mode of the multiple indexing modes. In at least some example embodiments, the most frequently used indexing mode of the multiple indexing modes is determined based on metadata indicative of respective frequencies with which the multiple indexing modes have been used for writing into the cache. In at least some example embodiments, the memory operation is a write operation and, to perform the write operation for the given memory block, the cache is configured to store, in a cache line of the selected one of the plurality of sets of the cache based on a determination that the cache line of the selected one of the plurality of sets of the cache is empty, the memory block. In at least some example embodiments, the cache is configured to store, within metadata of the cache, an indication of the selected indexing mode. In at least some example embodiments, the memory operation is a write operation and, to perform the write operation for the given memory block, the cache is configured to select, from the multiple indexing modes based on a determination that the selected one of the plurality of sets of the cache does not include an empty cache line, a next selected indexing mode, select, based on the next selected indexing mode, a next selected one of the plurality of sets of the cache, and perform, based on the next selected one of the plurality of sets of the cache, the write operation for the given memory block. In at least some example embodiments, the memory operation is a write operation and, to perform the write operation for the given memory block, the cache is configured to determine, from the multiple indexing modes based on a determination that the selected one of the plurality of sets of the cache does not include an empty cache line, whether each of the multiple indexing modes has been selected for attempting to write the memory block into the cache, evict, from the selected one of the plurality of sets of the cache based on a determination that each of the multiple indexing modes has been selected for attempting to write the memory block into the cache, a cache line, and store, in the cache line, the memory block. In at least some example embodiments, the memory operation is a read operation and, to perform the read operation for the given memory block, the cache is configured to perform, in the selected one of the plurality of sets of the cache, a lookup for a matching cache line and declare, based on a determination that the selected one of the plurality of sets of the cache includes a matching cache line, a hit for the memory block in the selected one of the plurality of sets of the cache. In at least some example embodiments, the memory operation is a read operation and, to perform the read operation for the given memory block, the cache is configured to select, from the multiple indexing modes based on a determination that a matching cache line is not found in the selected one of the plurality of sets of the cache, a next selected indexing mode, select, based on the next selected indexing mode, a next selected one of the plurality of sets of the cache, and perform, based on the next selected one of the plurality of sets of the cache, the read operation for the given memory block. In at least some example embodiments, the memory operation is a read operation and, to perform the read operation for the given memory block, the cache is configured to determine, from the multiple indexing modes based on a determination that a matching cache line is not found in the selected one of the plurality of sets of the cache, whether each of the multiple indexing modes has been selected for attempting to read the memory block from the cache and declare, based on a determination that each of the multiple indexing modes has been selected for attempting to read the memory block from the cache, a miss for the memory block in the cache. In at least some example embodiments, the cache includes an instruction cache, a micro-operations cache, a data cache, a unified cache, or a branch target buffer. In at least some example embodiments, the apparatus includes a processor, and the processor is configured to initiate the memory operation for the given memory block. In at least some example embodiments, a non-transitory computer readable medium includes program instructions that, when executed by an apparatus, cause the apparatus at least to detect, by a cache configured as a set associative cache having a plurality of sets, a request for a memory operation for a given memory block, wherein the cache is configured to support multiple indexing modes for indexing memory blocks, wherein the multiple indexing modes are configured to cause selection of different ones of the plurality of sets of the cache for the memory operation for the given memory block and perform, by the cache based on at least one of the multiple indexing modes, the memory operation for the given memory block.

In at least some example embodiments, a method includes operating a cache configured as a set associative cache having a plurality of sets, wherein the cache is configured to support multiple indexing modes for indexing memory blocks such that, for a memory operation for a given memory block, the multiple indexing modes are configured to cause selection of different ones of the plurality of sets of the cache for the memory operation for the given memory block. In at least some example embodiments, the multiple indexing modes use different subsets of bits of a memory block address of the given memory block to select the different ones of the plurality of sets of the cache for the memory operation for the given memory block. In at least some example embodiments, the different subsets of bits of the memory block address of the given memory block are disjoint subsets of bits of the memory block address of the given memory block. In at least some example embodiments, the given memory block has a memory block address associated therewith, the memory block address includes a first set of bits and a second set of bits, and a first indexing mode of the multiple indexing modes uses the first set of bits to index into the plurality of sets of the cache and a second indexing mode of the multiple indexing modes uses the second set of bits to index into the plurality of sets of the cache. In at least some example embodiments, the memory block address includes a third set of bits, and the third set of bits is an offset into a cache line within a selected one of the plurality of sets of the cache. In at least some example embodiments, the cache is configured as an N-way set associative cache having N ways, the given memory block has a memory block address associated therewith, the memory block address includes a first set of bits and a second set of bits, a first indexing mode of the multiple indexing modes uses a first subset of bits from the first set of bits to index into the plurality of sets of the cache and a second indexing mode of the multiple indexing modes uses a second subset of bits from first set of bits to index into the plurality of sets of the cache, and the second set of bits is used to identify one of the N ways within a selected one of the plurality of sets of the cache. In at least some example embodiments, the cache is configured to select, from the multiple indexing modes, a first indexing mode for the memory operation for the given memory block, and select, from the multiple indexing modes based on a determination that the memory operation for the given memory block is not completed using the first indexing mode, a second indexing mode for the memory operation for the given memory block. In at least some example embodiments, the cache is configured to select, from the multiple indexing modes for the given memory block, a selected indexing mode, select, based on the selected indexing mode, a selected one of the plurality of sets of the cache, and perform, based on the selected one of the plurality of sets of the cache, the memory operation for the given memory block. In at least some example embodiments, the memory operation is a write operation, and the selected indexing mode is selected from the multiple indexing modes randomly or in a round robin manner. In at least some example embodiments, the memory operation is a read operation, and the selected indexing mode is a most frequently used indexing mode of the multiple indexing modes. In at least some example embodiments, the most frequently used indexing mode of the multiple indexing modes is determined based on metadata indicative of respective frequencies with which the multiple indexing modes have been used for writing into the cache. In at least some example embodiments, the memory operation is a write operation and, to perform the write operation for the given memory block, the cache is configured to store, in a cache line of the selected one of the plurality of sets of the cache based on a determination that the cache line of the selected one of the plurality of sets of the cache is empty, the memory block. In at least some example embodiments, the cache is configured to store, within metadata of the cache, an indication of the selected indexing mode. In at least some example embodiments, the memory operation is a write operation and, to perform the write operation for the given memory block, the cache is configured to select, from the multiple indexing modes based on a determination that the selected one of the plurality of sets of the cache does not include an empty cache line, a next selected indexing mode, select, based on the next selected indexing mode, a next selected one of the plurality of sets of the cache, and perform, based on the next selected one of the plurality of sets of the cache, the write operation for the given memory block. In at least some example embodiments, the memory operation is a write operation and, to perform the write operation for the given memory block, the cache is configured to determine, from the multiple indexing modes based on a determination that the selected one of the plurality of sets of the cache does not include an empty cache line, whether each of the multiple indexing modes has been selected for attempting to write the memory block into the cache, evict, from the selected one of the plurality of sets of the cache based on a determination that each of the multiple indexing modes has been selected for attempting to write the memory block into the cache, a cache line, and store, in the cache line, the memory block. In at least some example embodiments, the memory operation is a read operation and, to perform the read operation for the given memory block, the cache is configured to perform, in the selected one of the plurality of sets of the cache, a lookup for a matching cache line and declare, based on a determination that the selected one of the plurality of sets of the cache includes a matching cache line, a hit for the memory block in the selected one of the plurality of sets of the cache. In at least some example embodiments, the memory operation is a read operation and, to perform the read operation for the given memory block, the cache is configured to select, from the multiple indexing modes based on a determination that a matching cache line is not found in the selected one of the plurality of sets of the cache, a next selected indexing mode, select, based on the next selected indexing mode, a next selected one of the plurality of sets of the cache, and perform, based on the next selected one of the plurality of sets of the cache, the read operation for the given memory block. In at least some example embodiments, the memory operation is a read operation and, to perform the read operation for the given memory block, the cache is configured to determine, from the multiple indexing modes based on a determination that a matching cache line is not found in the selected one of the plurality of sets of the cache, whether each of the multiple indexing modes has been selected for attempting to read the memory block from the cache and declare, based on a determination that each of the multiple indexing modes has been selected for attempting to read the memory block from the cache, a miss for the memory block in the cache. In at least some example embodiments, the cache includes an instruction cache, a micro-operations cache, a data cache, a unified cache, or a branch target buffer. In at least some example embodiments, the apparatus includes a processor, and the processor is configured to initiate the memory operation for the given memory block. In at least some example embodiments, a method includes detecting, by a cache configured as a set associative cache having a plurality of sets, a request for a memory operation for a given memory block, wherein the cache is configured to support multiple indexing modes for indexing memory blocks, wherein the multiple indexing modes are configured to cause selection of different ones of the plurality of sets of the cache for the memory operation for the given memory block and performing, by the cache based on at least one of the multiple indexing modes, the memory operation for the given memory block.

In at least some example embodiments, an apparatus includes means for operating a cache configured as a set associative cache having a plurality of sets, wherein the cache is configured to support multiple indexing modes for indexing memory blocks such that, for a memory operation for a given memory block, the multiple indexing modes are configured to cause selection of different ones of the plurality of sets of the cache for the memory operation for the given memory block. In at least some example embodiments, the multiple indexing modes use different subsets of bits of a memory block address of the given memory block to select the different ones of the plurality of sets of the cache for the memory operation for the given memory block. In at least some example embodiments, the different subsets of bits of the memory block address of the given memory block are disjoint subsets of bits of the memory block address of the given memory block. In at least some example embodiments, the given memory block has a memory block address associated therewith, the memory block address includes a first set of bits and a second set of bits, and a first indexing mode of the multiple indexing modes uses the first set of bits to index into the plurality of sets of the cache and a second indexing mode of the multiple indexing modes uses the second set of bits to index into the plurality of sets of the cache. In at least some example embodiments, the memory block address includes a third set of bits, and the third set of bits is an offset into a cache line within a selected one of the plurality of sets of the cache. In at least some example embodiments, the cache is configured as an N-way set associative cache having N ways, the given memory block has a memory block address associated therewith, the memory block address includes a first set of bits and a second set of bits, a first indexing mode of the multiple indexing modes uses a first subset of bits from the first set of bits to index into the plurality of sets of the cache and a second indexing mode of the multiple indexing modes uses a second subset of bits from first set of bits to index into the plurality of sets of the cache, and the second set of bits is used to identify one of the N ways within a selected one of the plurality of sets of the cache. In at least some example embodiments, the cache is configured to select, from the multiple indexing modes, a first indexing mode for the memory operation for the given memory block, and select, from the multiple indexing modes based on a determination that the memory operation for the given memory block is not completed using the first indexing mode, a second indexing mode for the memory operation for the given memory block. In at least some example embodiments, the cache is configured to select, from the multiple indexing modes for the given memory block, a selected indexing mode, select, based on the selected indexing mode, a selected one of the plurality of sets of the cache, and perform, based on the selected one of the plurality of sets of the cache, the memory operation for the given memory block. In at least some example embodiments, the memory operation is a write operation, and the selected indexing mode is selected from the multiple indexing modes randomly or in a round robin manner. In at least some example embodiments, the memory operation is a read operation, and the selected indexing mode is a most frequently used indexing mode of the multiple indexing modes. In at least some example embodiments, the most frequently used indexing mode of the multiple indexing modes is determined based on metadata indicative of respective frequencies with which the multiple indexing modes have been used for writing into the cache. In at least some example embodiments, the memory operation is a write operation and, to perform the write operation for the given memory block, the cache is configured to store, in a cache line of the selected one of the plurality of sets of the cache based on a determination that the cache line of the selected one of the plurality of sets of the cache is empty, the memory block. In at least some example embodiments, the cache is configured to store, within metadata of the cache, an indication of the selected indexing mode. In at least some example embodiments, the memory operation is a write operation and, to perform the write operation for the given memory block, the cache is configured to select, from the multiple indexing modes based on a determination that the selected one of the plurality of sets of the cache does not include an empty cache line, a next selected indexing mode, select, based on the next selected indexing mode, a next selected one of the plurality of sets of the cache, and perform, based on the next selected one of the plurality of sets of the cache, the write operation for the given memory block. In at least some example embodiments, the memory operation is a write operation and, to perform the write operation for the given memory block, the cache is configured to determine, from the multiple indexing modes based on a determination that the selected one of the plurality of sets of the cache does not include an empty cache line, whether each of the multiple indexing modes has been selected for attempting to write the memory block into the cache, evict, from the selected one of the plurality of sets of the cache based on a determination that each of the multiple indexing modes has been selected for attempting to write the memory block into the cache, a cache line, and store, in the cache line, the memory block. In at least some example embodiments, the memory operation is a read operation and, to perform the read operation for the given memory block, the cache is configured to perform, in the selected one of the plurality of sets of the cache, a lookup for a matching cache line and declare, based on a determination that the selected one of the plurality of sets of the cache includes a matching cache line, a hit for the memory block in the selected one of the plurality of sets of the cache. In at least some example embodiments, the memory operation is a read operation and, to perform the read operation for the given memory block, the cache is configured to select, from the multiple indexing modes based on a determination that a matching cache line is not found in the selected one of the plurality of sets of the cache, a next selected indexing mode, select, based on the next selected indexing mode, a next selected one of the plurality of sets of the cache, and perform, based on the next selected one of the plurality of sets of the cache, the read operation for the given memory block.

In at least some example embodiments, the memory operation is a read operation and, to perform the read operation for the given memory block, the cache is configured to determine, from the multiple indexing modes based on a determination that a matching cache line is not found in the selected one of the plurality of sets of the cache, whether each of the multiple indexing modes has been selected for attempting to read the memory block from the cache and declare, based on a determination that each of the multiple indexing modes has been selected for attempting to read the memory block from the cache, a miss for the memory block in the cache. In at least some example embodiments, the cache includes an instruction cache, a micro-operations cache, a data cache, a unified cache, or a branch target buffer. In at least some example embodiments, the apparatus includes a processor, and the processor is configured to initiate the memory operation for the given memory block. In at least some example embodiments, a method includes means for detecting, by a cache configured as a set associative cache having a plurality of sets, a request for a memory operation for a given memory block, wherein the cache is configured to support multiple indexing modes for indexing memory blocks, wherein the multiple indexing modes are configured to cause selection of different ones of the plurality of sets of the cache for the memory operation for the given memory block and means for performing, by the cache based on at least one of the multiple indexing modes, the memory operation for the given memory block.

In at least some example embodiments, an apparatus includes a cache configured as a set associative cache having a plurality of sets, wherein the cache is configured to support a memory operation for a memory block, wherein the memory block has a memory block address associated therewith, wherein the cache is configured to support a first indexing mode in which the cache uses a first subset of bits of the memory block address to index into the plurality of sets of the cache for the memory operation and a second indexing mode in which the cache uses a second subset of bits of the memory block address to index into the plurality of sets of the cache for the memory operation. In at least some example embodiments, the first subset of bits of the memory block address and the second subset of bits of the memory block address are disjoint subsets of bits of the memory block address. In at least some example embodiments, the cache is configured to perform the memory operation for the memory block using one of the sets in the plurality of sets of the cache selected based on the first indexing mode. In at least some example embodiments, the cache is configured to determine that the memory operation for the memory block cannot be completed using a first set selected from the plurality of sets of the cache based on the first indexing mode and perform the memory operation for the memory block using a second set selected from the plurality of sets of the cache based on the second indexing mode.

In at least some example embodiments, a non-transitory computer readable medium includes program instructions that, when executed by an apparatus, cause the apparatus at least to operate a cache configured as a set associative cache having a plurality of sets, wherein the cache is configured to support a memory operation for a memory block, wherein the memory block has a memory block address associated therewith, wherein the cache is configured to support a first indexing mode in which the cache uses a first subset of bits of the memory block address to index into the plurality of sets of the cache for the memory operation and a second indexing mode in which the cache uses a second subset of bits of the memory block address to index into the plurality of sets of the cache for the memory operation. In at least some example embodiments, the first subset of bits of the memory block address and the second subset of bits of the memory block address are disjoint subsets of bits of the memory block address. In at least some example embodiments, the cache is configured to perform the memory operation for the memory block using one of the sets in the plurality of sets of the cache selected based on the first indexing mode. In at least some example embodiments, the cache is configured to determine that the memory operation for the memory block cannot be completed using a first set selected from the plurality of sets of the cache based on the first indexing mode and perform the memory operation for the memory block using a second set selected from the plurality of sets of the cache based on the second indexing mode.

In at least some example embodiments, a method includes operating a cache configured as a set associative cache having a plurality of sets, wherein the cache is configured to support a memory operation for a memory block, wherein the memory block has a memory block address associated therewith, wherein the cache is configured to support a first indexing mode in which the cache uses a first subset of bits of the memory block address to index into the plurality of sets of the cache for the memory operation and a second indexing mode in which the cache uses a second subset of bits of the memory block address to index into the plurality of sets of the cache for the memory operation. In at least some example embodiments, the first subset of bits of the memory block address and the second subset of bits of the memory block address are disjoint subsets of bits of the memory block address. In at least some example embodiments, the cache is configured to perform the memory operation for the memory block using one of the sets in the plurality of sets of the cache selected based on the first indexing mode. In at least some example embodiments, the cache is configured to determine that the memory operation for the memory block cannot be completed using a first set selected from the plurality of sets of the cache based on the first indexing mode and perform the memory operation for the memory block using a second set selected from the plurality of sets of the cache based on the second indexing mode In at least some example embodiments, an apparatus includes means for operating a cache configured as a set associative cache having a plurality of sets, wherein the cache is configured to support a memory operation for a memory block, wherein the memory block has a memory block address associated therewith, wherein the cache is configured to support a first indexing mode in which the cache uses a first subset of bits of the memory block address to index into the plurality of sets of the cache for the memory operation and a second indexing mode in which the cache uses a second subset of bits of the memory block address to index into the plurality of sets of the cache for the memory operation. In at least some example embodiments, the first subset of bits of the memory block address and the second subset of bits of the memory block address are disjoint subsets of bits of the memory block address. In at least some example embodiments, the cache is configured to perform the memory operation for the memory block using one of the sets in the plurality of sets of the cache selected based on the first indexing mode. In at least some example embodiments, the cache is configured to determine that the memory operation for the memory block cannot be completed using a first set selected from the plurality of sets of the cache based on the first indexing mode and perform the memory operation for the memory block using a second set selected from the plurality of sets of the cache based on the second indexing mode.

BRIEF DESCRIPTION OF THE DRAWINGS

The teachings herein can be readily understood by considering the following detailed description in conjunction with the accompanying drawings, in which:

FIG. 9 depicts an example embodiment of an address partitioning based on the first indexing mode of FIG. 8;

FIG. 10 depicts an example embodiment of a state of the multi-mode indexed cache supporting the indexing modes of FIG. 8 before storage of a memory block where the attempt to store the memory block is based on the address partitioning of FIG. 9;

FIG. 11 depicts an example embodiment of an address partitioning based on the second indexing mode of FIG. 8;

FIG. 12 depicts an example embodiment of a state of the multi-mode indexed cache supporting the indexing modes of FIG. 8 after storage of a memory block where the attempt to store the memory block is based on the address partitioning of FIG. 11;

To facilitate understanding, identical reference numerals have been used herein, wherever possible, in order to designate identical elements that are common among the various figures.

DETAILED DESCRIPTION

Various example embodiments for supporting processor capabilities are presented herein. Various example embodiments for supporting processor capabilities may be configured to support increased efficiency in utilization of a cache of a processor. Various example embodiments for supporting increased efficiency in utilization of a cache of a processor may be configured to support increased efficiency in utilization of the cache of the processor based on implementation of the cache of the processor as a multi-mode indexed cache. Various example embodiments for providing a multi-mode indexed cache may be configured to provide a multi-mode indexed cache configured as a set associative cache having a plurality of sets, wherein the cache is configured to support multiple indexing modes for indexing memory blocks such that, for a memory operation for a given memory block, the multiple indexing modes are configured to cause selection of different ones of the plurality of sets of the cache for the memory operation for the given memory block. Various example embodiments for providing a multi-mode indexed cache may be configured to provide a multi-mode indexed cache configured as a set associative cache having a plurality of sets, wherein the cache is configured to support a memory operation for a memory block, wherein the memory block has a memory block address associated therewith, wherein the cache is configured to support a first indexing mode in which the cache uses a first subset of bits of the memory block address to index into the plurality of sets of the cache for the memory operation and a second indexing mode in which the cache uses a second subset of bits of the memory block address to index into the plurality of sets of the cache for the memory operation. Various example embodiments for providing a multi-mode indexed cache may be configured to implemented various types of caches as multi-mode indexed caches (e.g., an instruction cache (IC) of a processor, a micro-operations cache (UC) of a processor, a data cache (DC) of a processor, a unified cache of a processor that can host instructions and data, a branch target buffer (BTB) associated with a branch predictor of a processor, or the like). It will be appreciated that these and various other example embodiments and advantages or potential advantages of example embodiments for supporting processor capabilities may be further understood by way of reference to the various figures, which are discussed further below.

Figure 1:
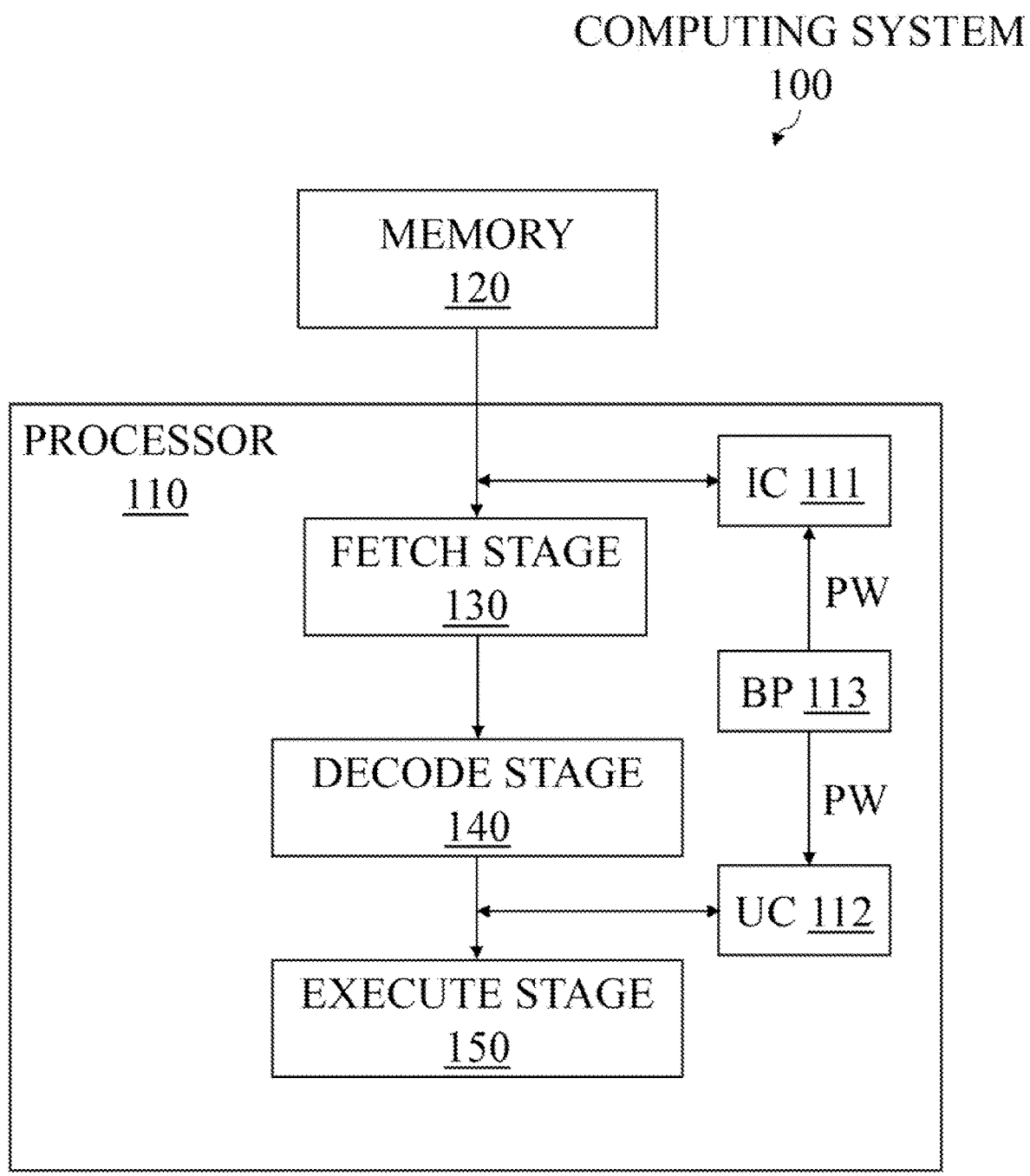
FIG. 1 depicts an example embodiment of a computing system including a processor and a memory for illustrating an instruction pipeline supported by the processor.

FIG. 1 depicts an example embodiment of computing system including a processor and a memory for illustrating an instruction pipeline supported by the processor.

The computing system 100 includes a processor 110 and a memory 120. The processor 110 includes an instruction cache (IC) 111, a micro-operations cache (UC) 112, and a branch predictor (BP) 113. The high level stages in the pipeline supported by the processor 110 include a fetch stage 130, a decode stage 140, and an execute stage 150.

In the processor 110, the format and encoding of the instructions in a program to be executed by the processor 110 is determined by the Instruction Set Architecture (ISA) of the processor 110. For example, some well-known ISAs include x86/x86-64, IA-32/IA-64, MIPS, ARM, and so forth; however, the micro-architecture of a processor typically cannot execute the instructions of an ISA in their native form because of their complexity. An ISA is designed to offer sophisticated operations which, in turn, also keep the program compact, i.e., reduces the footprint of a program in the memory. It is noted that the optimal footprint of a program in memory is particularly important for optimal use of the IC. A majority of ISAs offer variable-length instructions, which further adds to the complexity of execution. So, at the micro-architectural level of a processor, instructions are represented by fixed-length simpler micro-operations (generally referred to as "micro-ops" or "UOPs"). An ISA instruction is broken down into one or more fixed-length UOPs. UOPs perform basic operations on data stored in one or more registers, including transferring data between registers or between registers and external buses, performing arithmetic and logical operations on registers, or the like. For example, for an add-register-to-memory ISA instruction that performs addition of the value in a register X to the value in a memory location M, the instruction is broken down into a sequence of three separate UOPs as follows: (1) load from M to a register Y, (2) add Y to X, and (3) store X to M.

In the processor 110, execution of a program is based on a pipeline which, as indicated above, includes the fetch stage 130, the decode stage 140, and the execute stage 150. The fetch stage 130 retrieves a block of instructions of a program from the IC 111 or the memory 120. The IC 111 is located on-board the processor 110. The IC 111 is generally much smaller in size (e.g., 32 kB, 64 kB, 128 kB, or the like) than the memory 120 and, thus, much faster than the memory 120. The IC 111 caches blocks of instructions fetched from the memory 120 in units called "IC lines" (or, more generally, cache lines). If a set of instructions is repeatedly fetched then those instructions are likely available in the IC 111, so a hit in the IC 111 reduces the time to fetch instructions (as compared with fetching the instructions from the memory 120). The IC 111 is agnostic of syntax and semantics of instructions and an IC line caches a memory block, i.e., all instructions in a fixed range of addresses in the memory 120. The typical size of an IC line is 64 B, although it will be appreciated that other sizes can be supported. The processor 110 fetches a block of instructions from the memory 120 only if the IC line is not found in the IC 111. In the IC 111, a memory block is identified by the first memory address in the memory block. In the decode stage 140, instructions fetched during the fetch stage 130 are dynamically decoded by the processor 110 to the native UOPs of the instructions. This dynamic decoding also provides a cleaner separation of the "stable" and "standardized" ISA from the underlying micro-architecture of the processor 110 that is free to define its own UOP set. As a result, a program that has been written for an ISA can run on different micro-architectures supporting that ISA. This has enabled program compatibility between different generations of processors to be easily achieved. For example, different micro-architectures can support the same ISA, but each can define their own native UOP set. The execute stage 150 executes the UOPs supplied by the decode stage 140.

In the processor 110, the fetch stage 130 and the decode stage 140 generally are costly in terms of clock cycles as well as power consumption. So, many modern processors implement another instruction cache, typically referred to as a micro-op cache (UC) or decoded stream buffer (DSB), which stores the already decoded UOPs. This is illustrated as the UC 112 of the processor 110. When the processor 110 needs to execute an instruction and its decoded UOPs already exists in the UC 112, then the UC 112 can directly supply the UOPs to the execute stage 150. The UC 112 is generally much smaller in size (e.g. 1.5 kB, 2 kB, 3 kB, or the like) than the IC 111 and the memory 120 and, thus, much faster than the IC 111 and the memory 120 (typically operating at the clock speed of the processor 110). A hit in UC 112 eliminates the fetch stage 130 and the decode stage 140, both of which are costly, thereby improving the performance and power budget of the processor 110. An instruction is fetched and decoded only if it is a miss in the UC 112, otherwise the fetch stage 130 and the decode stage 140 can be powered off. It is noted that, although omitted from FIG. 1 for purposes of clarity, some processors may use a component called a Trace Cache (TC) instead of a UC, where a TC is simpler than a UC since a TC is a single large block including all instructions or micro-operations of a control flow.

In the processor 110, the UC 112 stores the UOPs received from the decode stage 140 in smaller sized blocks, but in the sequential order of execution. This means that each branch, conditional or unconditional, makes the processor 110 start with a new UC line even if the current IC line is not yet filled. This simple rule allows high bandwidth fetching from the UC 112 since, once there is a hit in UC 112, then the entire UC line can be supplied to the execute stage 150 without worrying about a change of execution sequence in the middle of a UC line. Herein, unless indicated otherwise, an address of an instruction in memory is referred to as an Instruction Pointer (IP). A UC line is identified by the IP of the parent instruction of the first UOP in the UC line; other than that no correlation exists between the UOPs in a UC line and their corresponding parent instructions, and it is noted that such correlation is not required since the entire UC line is supplied to the execute stage 150. As a result, UOPs in a UC line typically cannot be looked up by the IPs of their parent instructions.

In the processor 110, the BP 113 is configured to predict the outcome of a conditional branch instruction while fetching instructions from the memory 120, the IC 111, or the UC 112. A program may include branch instructions that alter the sequence of instructions executed by the processor 110. Branch instructions generally are of two types: one-way unconditional branch instruction and two-way conditional branch instruction. An unconditional branch instruction always jumps to a different location in program memory where a branch of the program code is stored. A conditional branch instruction can either be (1) "not taken" and continue execution with the first branch of the code which follows immediately after the conditional branch instruction or (2) "taken" and jump to a different place in program memory where the second branch of the code is stored. The outcome of a conditional branch instruction depends on certain conditions, such as a predicate variable. It is not known for certain whether a conditional branch will be taken or not taken until the condition has been calculated and the conditional branch has passed the execute stage 150 in the instruction pipeline. That means the processor 110 would have to wait until the conditional branch instruction has passed the execute stage 150 before the next instruction can enter the fetch stage 130 in the pipeline, which basically stalls the pipeline. To solve this problem, the front-end of the processor 110 tries to guess whether the conditional branch is more likely to be taken or not taken. The branch that is guessed to be the most likely is then fetched and speculatively executed. The BP 113 is logic circuitry that enables the front-end of the processor 110 to predict the outcome of a conditional branch instruction. If later it is detected that the guess was wrong, then the speculatively executed or partially executed instructions are discarded and the pipeline starts over with the correct branch, incurring a delay called "branch misprediction penalty".

It will be appreciated that processors generally implement each of the three high-level stages of the instruction pipeline using component stages. As a result, a pipeline of a processor may be composed of a large number of stages (e.g., 20 or more stages). An example of a processor, for illustrating stages used to implement portions of the instruction pipeline, is presented with respect to FIG. 2.

Figure 2:
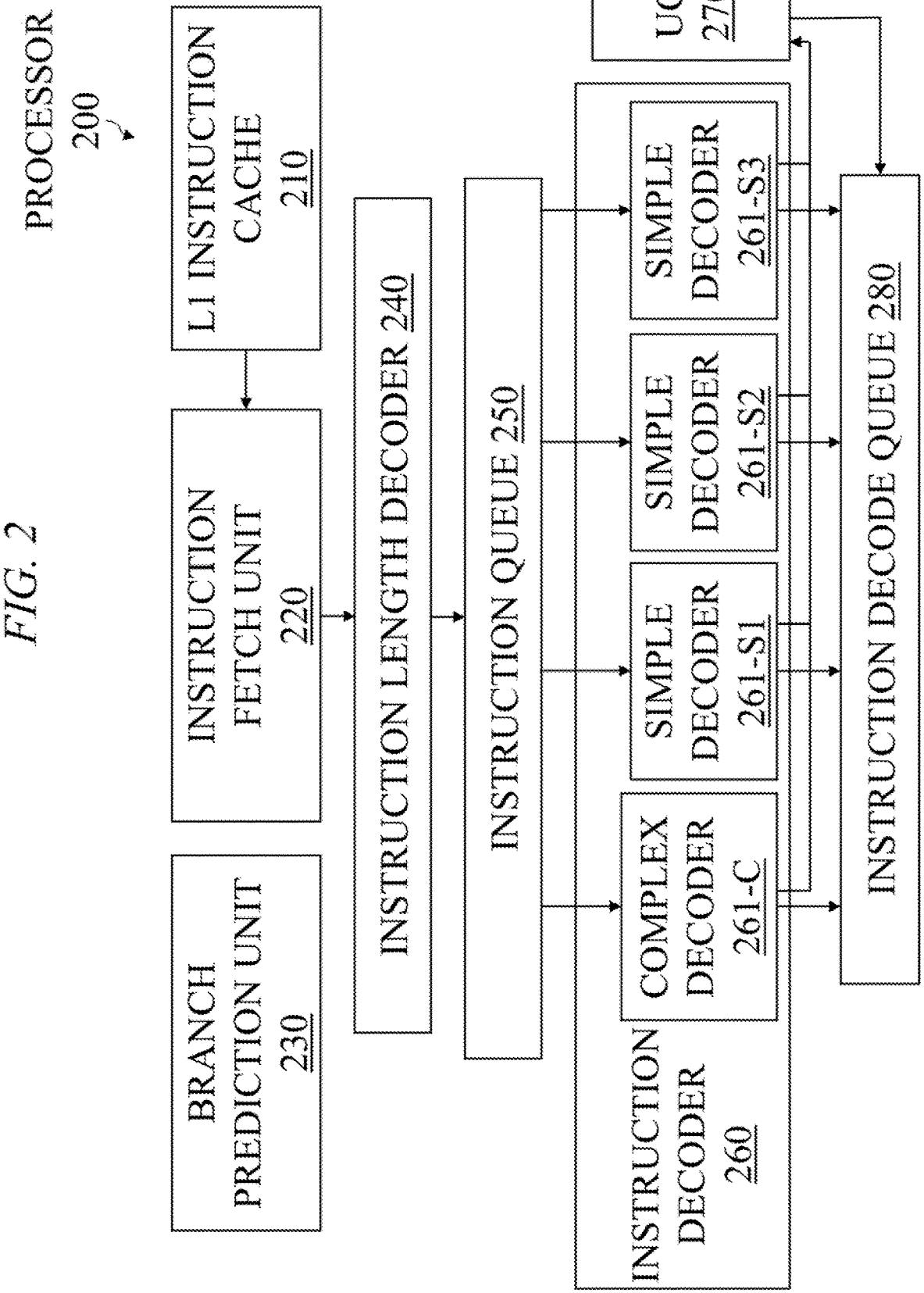
FIG. 2 depicts an example embodiment of a processor for use as the processor of the computing system of FIG. 1.

FIG. 2 depicts an example embodiment of a processor for use as the processor of the computing system of FIG. 1.

The processor 200 may include a frontend and a backend. It is noted that while details of the frontend are illustrated, details of the backend have been omitted for purposes of clarity.

The processor 200 includes a level 1 (L1) instruction cache (L1-IC) 210, an instruction fetch unit (IFU) 220, a branch prediction unit (BPU) 230, an instruction length decoder (ILD) 240, an instruction queue (IQ) 250, an instruction decoder (ID) 260, a UOP cache (UC) 270, and an instruction decode queue (IDQ) 280. It will be appreciated that the IFU 220 and BPU 230 may be considered to form the fetch stage while the ILD 240, IQ 250, ID 260, and IDQ 280 may be considered to form the decode stage.

The L1-IC 210 is a cache that is part of the cache hierarchy of the processor 200, and which may be further understood by considering the cache hierarchy of processors and the cache arrangement of caches in general.

In general, a cache is a smaller, faster memory, closer to a processor, which stores copies of the program instructions or program data from frequently accessed memory locations to reduce the average cost of access (time or energy). The program instructions or program data are stored in the cache by blocks of contiguous memory locations, typically referred to as cache lines, where each cache line is indexed in the cache by the first memory address in the cache line. Caches benefit from the temporal and spatial locality of memory access patterns in a program, where spatial locality refers to use of relatively close memory locations (e.g., within a cache line) and temporal locality refers to the reuse of specific caches line within a relatively small time duration. Many processors use multiple levels of caches. For example, a common processor architecture might utilize at least three levels (L) of caches, which are typically referred to as L1, L2, and L3. The L1 cache is the smallest and nearest to the processor cores and, thus, faster than the other cache levels. Typically, the L1 cache is split into two portions: the L1 Instruction Cache (e.g., 32 kB in size, 64 kB in size, or the like, although other sizes may be used) which holds only program instructions and the L1 Data Cache (e.g., 32 kB in size, 64 kB in size, or the like, although other sizes may be used) which holds only program data. The L2 cache (e.g., 256 kB in size, 512 kB in size, or the like, although other sizes may be used) and the L3 cache (e.g., 2 MB in size, 4 MB in size, or the like, although other sizes may be used) are the subsequent levels which are usually unified caches (meaning that they hold both program instructions and program data). The L3 cache typically is common for the processor cores in a multi-core processor and, thus, is located outside of the processor cores. It will be appreciated that the cache size and access latency grow according to the levels. If the cache line corresponding to a memory address sought is missing in the L1 cache, then the processor performs lookups in subsequent levels of caches (e.g., L2 cache, then L3 cache, and so forth). If the memory address is missing in all of the available cache levels, then the processor can access the main memory to retrieve the instruction or data at the memory address. So, main memory is accessed only if the memory address is missing in all caches. The missing block, once located, is brought into a cache line in the L1 cache.

In general, a cache is typically organized as set associative array, which can be imagined as M×N matrix. The cache is divided into M sets and each set contains N cache lines. To place a memory block into the cache, its address is typically divided into three fields: tag, index, offset. A memory block is first mapped into a set based on 'index bits' derived from the address of the memory block. Then the memory block is placed into a cache line in the set and a 'tag' is stored in the cache line. The tag is composed of the bits in the address of the memory block (other than the index bits) that can distinguish between the cache lines sharing the same set. The offset field refers to any address within a cache line. The offset field is composed of a few least significant bits of the address of the memory block and the number of bits is dependent on the size of the cache line. For example, if the cache line size is 64 B, then the 6 least significant bits of the addresses of the memory blocks may be used as the offset bits. As previously indicated, the term "IP" is used to denote the memory address of an instruction, and the three fields of an IP that are used to map a block of instructions into a cache are referred to as IP-tag, IP-index, and IP-offset. In a typical cache, if all cache lines in a set are occupied while trying to store a new memory block, then an existing cache line in the set is evicted (a replacement policy picks which cache line to evict) to make way for the new memory block. When the evicted cache line is accessed later, then it will result in a miss in the cache and, thus, will need to be brought back into the cache from the memory hierarchy. Such misses are referred to as conflict misses and repeated conflict misses due to collisions between cache lines sharing the same set is referred to as thrashing. If a cache line is evicted due to capacity overflow (i.e., no more unused cache lines across the cache) and the evicted cache line is accessed again then it will result in a miss in the cache. Such misses are called capacity misses. Capacity misses are extremely rare and most often the misses are due to thrashing.

The IFU 220 is responsible for feeding the processor with instructions to execute, and thus, it is the first component where instructions are processed. The IFU 220 mainly includes the required logic to compute the next fetch address and then fetch the instructions from the L1-IC 210. The instructions are fetched from the L1-IC 210 by the IFU 220 in streams of raw bytes.

The BPU 230 is configured to predict the next fetch address for the IFU 220 because, otherwise, branch instructions introduce a significant extra level of complexity in fetching streams of instructions, since the correct fetch address cannot be calculated until the branch instruction itself is executed. By default, instructions are processed by a processor sequentially. This sequential execution can be disrupted by the control instructions (e.g., conditional branches, unconditional branches, subroutine calls and subroutine returns, and so forth) to start executing an instruction sequence starting at a new address (the target address). For example, JE (Jump If Equal) is an example of a conditional branch instruction in x86 which is dependent on equality of two variables (data elements). A conditional branch is data-dependent (e.g., value of data acts as the condition) and branches to the target address only if the condition is true. An unconditional branch instruction always branches to the target address. For example, instructions such as CALL, RET, and JUMP are examples of unconditional branches for a subroutine call, a subroutine return, and an unconditional branch, respectively, in x86. Any control instruction other than a conditional branch instruction will switch the execution sequence to the target address specified in the instruction. Herein, the target instruction sequence of a control instruction is referred to generally as a control block. Execution of a program can be viewed as executing a chain of certain control blocks. Herein, an order of execution of control blocks in a program is referred to as a control flow (i.e., flow of control). Conditional branches (e.g., JE) can generate multiple control flows in a program since every such branch is a fork and the execution can go either way on the fork based on the condition of the fork. Control instructions introduce significant extra complexity in fetching streams of instructions, since the correct fetch address after the control instruction cannot be calculated until the backend executes the control instruction itself. For this reason, the frontend of high-performance processors (specifically, the BPU 230) predicts the next fetch address and speculatively starts fetching from the predicted address. There are two parts in this prediction. The first is predicting the direction of the branch taken by the control instruction, i.e., taken to the target sequence or not taken. The second part is predicting the target address of a branch. Once the direction of a branch is predicted, then the memory address of the control instruction and its predicted target address is stored in a Branch Target Buffer (BTB), which is a cache organized similar to the set associative array described in the context of L1-IC 210.

The ILD 240 provides a pre-decode phase. The ILD 240 separates the raw byte stream from the IFU 220 into a sequence of valid instructions and passes them to the IQ 250. For example, as indicated above, the length of an x86 instruction may vary between 1 B to 15 B and may reside in any byte address in program memory, thus requiring segregation of the raw byte stream into instructions of variable lengths. Decoding the length of several instructions per cycle adds a level of complexity, since the starting addresses have to be speculatively determined. That is, the fact that the starting address of the second instruction is not known until the length of the first instruction is computed, imposes serialization of the length decoding process, and parallelizing this requires determining the length of each instruction before decoding the instruction. The ILD 240 provides complex logic, based on many parallel and speculative computations, to help achieve such parallelization (although this comes at the price of increased power consumption).

The IQ 250 queues the instructions for the instruction decode phase. The IQ 250 queues the instructions, after the ILD 240 separates the instructions from the stream of raw bytes, for use by ID 260 in the instruction decode phase.

The ID 260 provides the instruction decode phase (which also may be referred to as a dynamic translation phase). In this phase, instructions are read from the IQ 250 and translated into subsequent functionally-equivalent UOPs. This translation is performed by one of several decoders in a set of decoders 261 including a complex decoder 261-C and three simple decoders 261-S1-261-S3 (although it will be appreciated that fewer or more instruction decoders may be used). Herein, the ID 260, including the set of decoders 261, also may be referred to as a Micro Instruction Translation Engine (MITE). The resultant UOPs are passed by the ID 260 to the IDQ 280, through which the UOPs may then enter the backend of the processor 200. For example, in an x86-based processor, simple instructions can translate into one to four UOPs and complex instructions can translate into five or more UOPs. It will be appreciated that, for processors based on other ISAs, instructions may be translated into other numbers of UOPs.

The UC 270, generally speaking, is a UOP cache that is configured to cache UOPs for instructions previously decoded by the MITE, thereby obviating a need for the MITE to re-decode instructions previously decoded by the MITE in order to obtain the associated UOPs (namely, avoiding the L1-IC→IFU→ILD→IQ→MITE decode path). This type of cache may be referred to as an L0 Instruction Cache (L0-IC), which may store blocks of instructions decoded into UOPs, in units of UC lines. UOP caches benefit from the temporal locality of control flows in a program, due to which previously executed instructions are executed again. Before fetching an instruction address from the L1-IC 210, it is first looked up in the L0-IC. If the corresponding UC line exists (meaning a "hit") in the L0-IC, then the associated UOPs are directly supplied to the IDQ 280 for further execution, thereby completely avoiding the L1-IC→IFU→ILD→IQ→MITE decoding path. If the corresponding UC line does not exist (meaning a "miss") in the L0-IC, then the instruction goes through entire complex decoding cycle through the L1-IC→IFU→ILD→IQ→MITE decoding path. The ability to avoid the L1-IC→IFU→ILD→IQ→MITE decoding path in this manner provide significant advantages, as the decoding process from instructions to UOPs (especially for high performance processors) can be costly in terms of circuitry, power consumption, and time, especially where a single complex instruction may perform several operations. It will be appreciated that, since the backend of a processor can execute several UOPs per clock cycle (e.g., six UOPs per cycle), the rate at which UOPs are supplied from the frontend of the processor 200 to the backend of the processor 200 is a key element of performance which may be achieved by high hit rate in the UC 270.

The IDQ 280 queues UOPs to be provided to the backend of the processor 200. The UOPs that are queued by the IDQ 280 may include UOPs decoded by the ID 260 (MITE) and UOPs delivered from the UC 270.

The backend of the processor 200, although the details are omitted for purposes of clarity, may include various elements such as a reorder buffer (e.g., configured to receive UOPs from the frontend of the processor 200), a unified reservation station having a set of ports configured to direct UOPs to various chains of elements), various elements or chains of elements configured to support execution of UOPs, or the like, as well as various combinations thereof.

Figure 3:
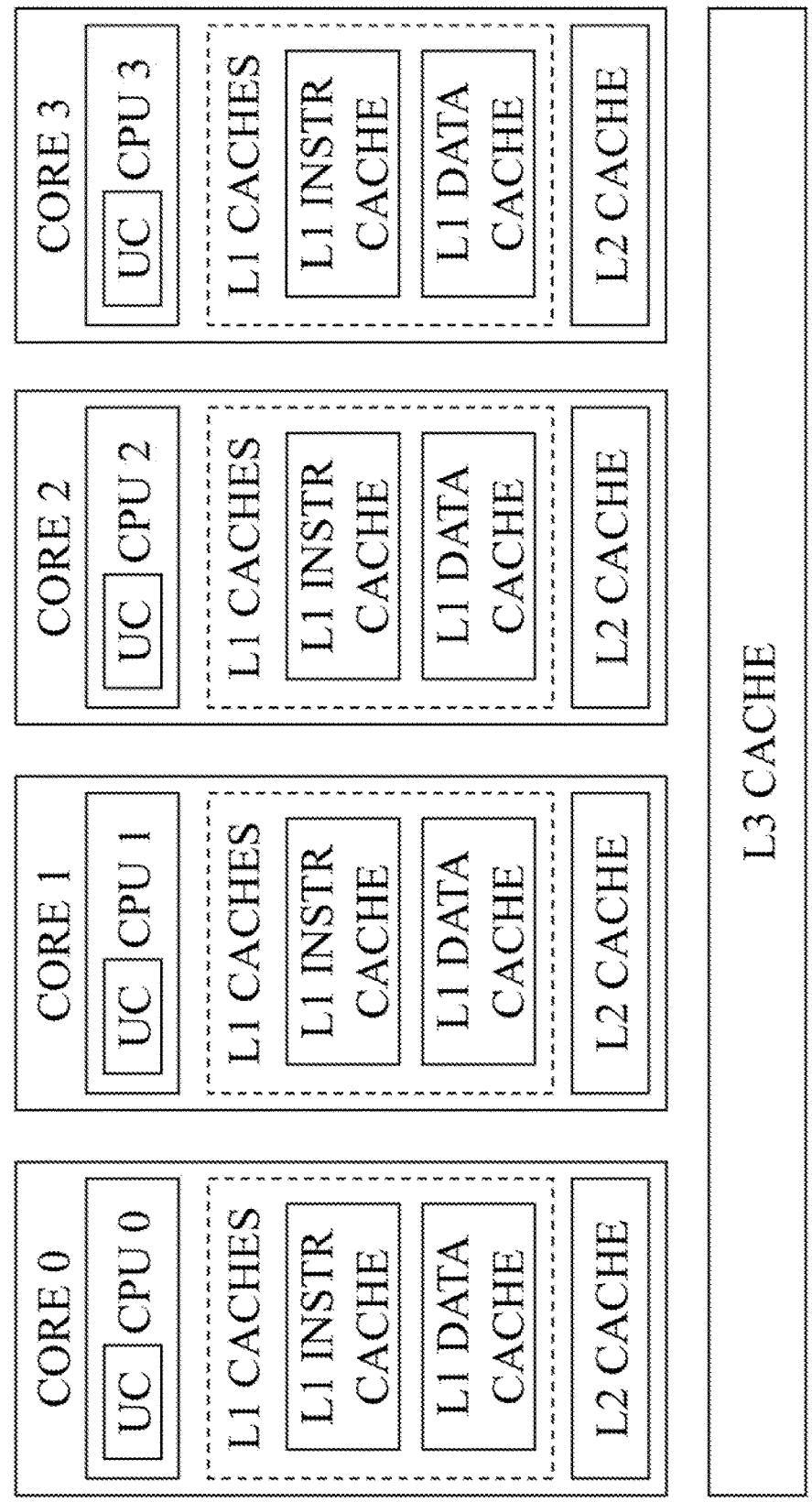
FIG. 3 depicts an example embodiment of a multi-core processor including multiple cores and multiple levels of caches.

FIG. 3 depicts an example embodiment of a multi-core processor including multiple cores and multiple levels of caches.

The multi-core processor 300 includes four cores (denoted as Core 0, Core 1, Core 2, and Core 3) and three levels of caches (denoted using L1, L2, and L3 indicators). In the multi-core processor 300, each of the cores includes a CPU (illustratively, including a micro-operations cache (UC)) and L1 and L2 caches (illustratively, including an L1 instruction cache, an L1 data cache, and an L2 cache), respectively. In the multi-core processor 300, the four cores share an L3 cache.

In general, a core is configured to operate as a processor (e.g., similar to the only core of a single core processor). It will be appreciated that each of the cores has its own pipeline (e.g., following the conceptual pipeline of FIG. 1, which may be implemented like the pipeline of FIG. 2 or using any other suitable pipeline implementation) that independently fetches, decodes, and executes instructions. Accordingly, herein, the term "processor" may be referring to the only core of a single core processor, a core of a multi-core processor, or a combination of multiple cores of a multi-core processor.

In general, a cache is a smaller, faster memory, closer to a processor core, which stores copies of the program instructions or program data from frequently used memory locations to reduce the average cost (e.g., time and/or energy) of operating the processor core. The program instructions or program data are stored in the cache by blocks of contiguous memory locations, referred to as cache lines, where each cache line is indexed in the cache by the first memory address in the cache line. Caches benefit from the temporal and spatial locality of memory access patterns in a program. Spatial locality refers to use of relatively close memory locations (e.g., within a cache line). Temporal locality refers to the reuse of a specific cache line within a relatively small time duration.

In a multi-core processor, the levels of caches generally are arranged hierarchically as discussed below (although it will be appreciated that other arrangements are possible). L1 caches and L2 caches are specific to the processor cores, respectively, of the processor (i.e., each processor core has its own L1 cache(s) and L2 cache associated therewith), whereas the L3 cache of the processor is common for all of the processor cores in the processor. For each processor core, the L1 cache is the smallest cache and nearest to the processor core and, thus, faster than the rest of the cache levels. For each processor core, the L1 cache is split into two caches as follows: an L1 Instruction Cache (e.g., 32 KB in size, 64 KB in size, or any other suitable size) which holds program instructions and an L1 Data Cache (e.g., 32K in size, 64 KB in size, or any other suitable size) which holds program data. The L1 Instruction Cache may correspond to the IC in FIG. 1. L2 caches (e.g., 256 KB in size, 512 KB in size, or any other suitable size) and L3 caches (e.g., 2 MB in size, 4 MB in size, or any other suitable size) are the subsequent levels of caches, which are usually unified caches (meaning that the caches hold both program instructions and program data). For each processor core, the L2 cache is further from the processor core than the L1 cache. As indicated above, the L3 cache of the processor is common for all of the processor cores in the processor. Size and access latency grow according to the levels. If the cache line corresponding to a memory address sought is missing in the L1 cache, then processor performs lookups in subsequent levels of caches. Main memory is accessed only if the memory address is missing in all caches. Eventually, the missing block is read into a cache line in the L1 cache. UC is located inside a core. It will be appreciated that the operation of ICs and UCs in processors may be further understood by first considering the logical organization of an IC in a processor.

Figure 4:
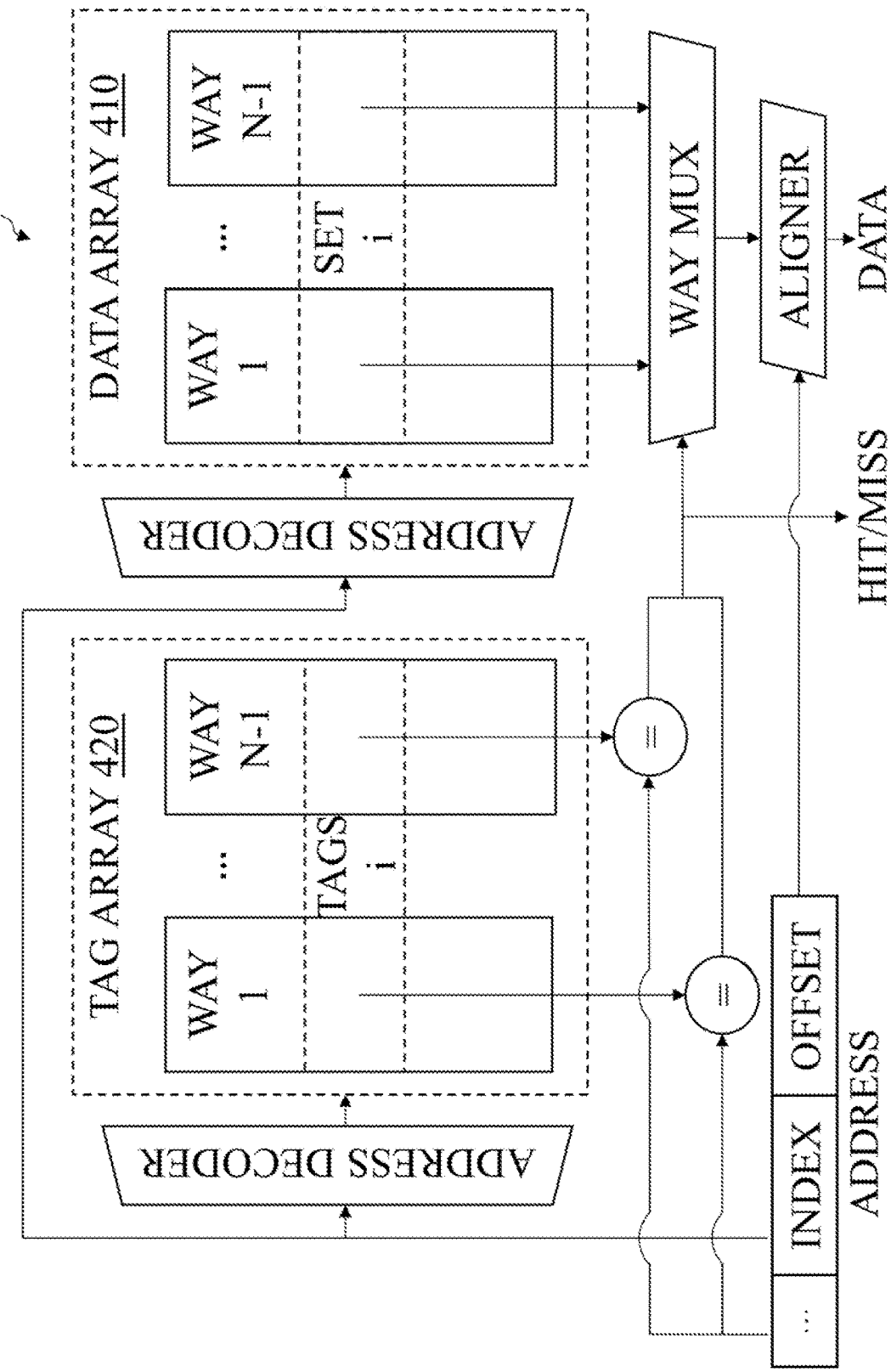
FIG. 4 depicts an example embodiment of an N-way set associative instruction cache for use in a processor.

FIG. 4 depicts an example embodiment of an N-way set associative instruction cache for use in a processor.

As illustrated in FIG. 4, the IC 400 includes two main building blocks: a data array 410 and a tag array 420.

The data array 410 stores the IC lines, while the tag array 420 is used in order to match IPs into data array entries. The data array 410 is logically organized as a group of S number of sets. Each set consists of N number of IC lines (which also may be referred to as "IC blocks"). The number of IC lines in a set is called the "degree of associativity" of the cache. It is noted that a cache of associativity N is an N-way associative cache, where each way is an IC line. A memory block is first mapped into a set Si by its IP and then placed into any IC line Nj in the set Si. To map a memory block into the IC 400, the IP is partitioned into three fields as illustrated in FIG. 5.

Figure 5:
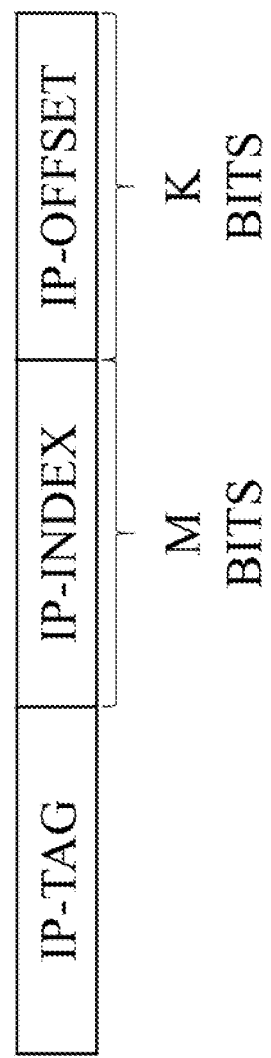
FIG. 5 depicts an example embodiment of an Instruction Pointer format for an address of an instruction in memory.

FIG. 5 depicts an example embodiment of an Instruction Pointer format for an address of an instruction in memory. As previously indicated, the term "IP" may be used to refer to the address of an instruction in memory (which also may be referred to as a memory block address). As illustrated in FIG. 5, the IP 500, in order to map a memory block into an IC, is partitioned into the following fields: IP-tag, IP-index, and IP-offset.

The IP-offset field (which also may be referred to as the block offset or, more generally, the offset) includes the K least significant bits of the IP, which are used to identify which bytes inside an IC line are to be accessed. Assuming the size of an IC line is Q bytes, then K=$\log_2(Q)$ bits in the IP-offset field. Herein, unless indicated otherwise, these K bits are denoted as IP-offset.

The IP-index field (which also may be referred to more generally as the index) includes the M next least significant bits of the IP, which are used to identify the set Si in the IC. For an IC consisting of S sets, M=$\log_2(S)$ bits are needed in the IP-index field. Herein, unless indicated otherwise, these M bits are denoted as IP-index.

The IP-tag field includes the remaining bits of the IP. Herein, unless indicated otherwise, these bits are denoted as IP-tag.

Different IC lines can map to the same set Si in the IC (they have the same IP-index due to overlapping M bits), so a mechanism is needed to reverse-map IP-indexes to IPs. The tag array serves this purpose. The tag array has the same logical organization as the data array (same number of sets S and associativity N). For each IC line in the data array, the tag array holds some metadata: the IP-tag bits and the state of the IC line (valid, etc.).

To lookup an IP, a set Si in both the data array and the tag array is accessed using the IP-index part, but, to know if an IC line within the set corresponds to the given IP, the IP-tag bits must match to an entry in the set Si in the tag array. If the IP-tag bits of the j-th entry in the set Si match, then the correct data is in the j-th IC line of the corresponding data array in the set Si (this is called a "cache hit"). If no IP-tags is in the set Si match in the tag array, then the requested IC line does not reside in the IC (this is a "cache miss"). In the case of a cache miss, a request to the higher levels of the memory hierarchy may be issued and the processor will wait for the IC line to be installed in the IC before the access can proceed.

As an example, consider an 8-way associative cache with 64 sets with a cache line size of 64 B. Then, each cache line would hold a block of 64 B of instructions. Here K=6 and M=6. If the processor tries to access an instruction at IP 0xf045 (tag=0x1e, index=0x1, offset=0x5), then the processor looks for the cache line in set 1 bearing the tag 0x1e. If the IC line is found, then the $5^{th}$ byte in the IC line is retrieved.

The access to the tag array and data array can occur serially or in parallel. In FIG. 4, a whole set is read from the data array while the tag array is accessed. The address is compared with the IP-tag entries to determine in which IC line of the set reside the data that needs to be accessed. This information is fed to a multiplexer at the output of the data array (the way multiplexer) that chooses one of the IC lines of the set. Finally, the offset part of the address is used to extract the appropriate bytes from the chosen IC line (this process is called data alignment).

The number of bits in the IP-offset field determines the size of an IC line, i.e., the size of an IC line is $\log_2$ (number of bits in IP-offset field). The set in the IC is selected based on IP-index and an IC line within the set (i.e., a way in the set) is tagged with the IP-tag. In the example in FIG. 4, IP-offset is 4-bits, IP-index is 4 bits, and IP-tag is 8-bits and, thus, for the exemplary IC line, IP-tag=0xFF and IP-index=0x0. Thus, the IC line is tagged with 0xFF in the set 0. As evident, all instructions within an IC line share the same IP-tag and IP-index.

In general, the design of a cache with the paradigm of FIG. 4 enables a simple and efficient of the cache in hardware and, thus, this design is the foundation of most caches found in processors. However, such a cache will suffer from conflict misses when Q number of frequently accessed memory blocks map to the same set Si, and the cache associativity N is less than Q. In that case, one of the valid cache lines in the set Si needs to be evicted to accommodate a newer memory block. When the evicted memory block is required by the processor again, then it will be a miss and will need to be fetched back to the cache. To make room for the memory block again, another cache line may need to be evicted and the pattern continues. This pattern is called thrashing of cache lines. The thrashing of cache lines may be further understood with respect to the following example.

Figure 6:
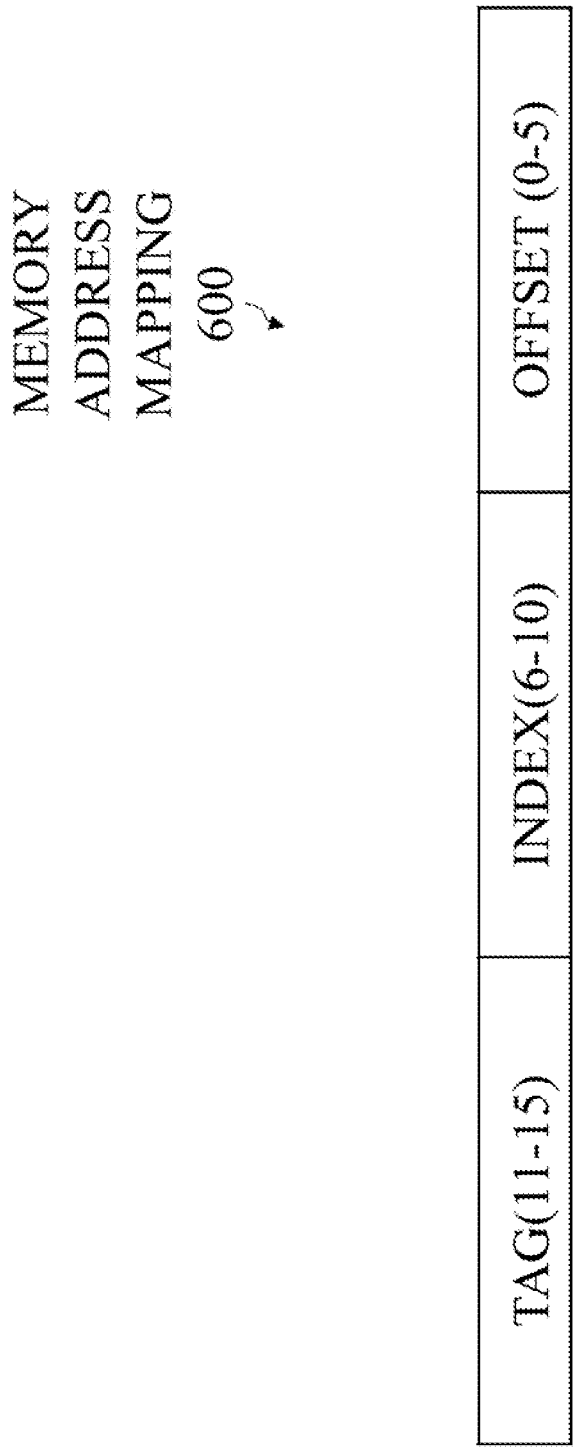
FIG. 6 depicts an example embodiment of Tag, Index, and Offset mappings of an address of a memory block where a single mode is supported.

In the example for illustrating thrashing of cache lines, assume that the 16-bit memory block with address 1011011010010101 needs to be stored in the cache. Also, assume that the size of a cache line is 64 B and there are 32 sets in the 8-way set associative cache. It is noted that the bit positions start from zero to higher from right to left. Additionally, assume that the Tag, Index, and Offset mappings of an address of a memory block are as shown in FIG. 6. As illustrated in the memory address mapping 600 of FIG. 6, Bits 0-5 are used for indexing an offset in a 64 B cache line, Bits 6-10 are used for indexing one of the 32 sets in the cache, and Bits 11-15 are used as Tag. The set is determined by the Index bits 11010, which maps to set 26.

Figure 7:
FIG. 7 depicts an example embodiment of a set associative cache before storing a memory block based on the single mode mapping of FIG. 6.

In the example for illustrating thrashing of cache lines, assume that the current state of the set associative cache, before storing a memory block based on the single mode mapping of FIG. 6, is as shown in FIG. 7. In the set associative cache 700 of FIG. 7, only a few of the Sets are shown (for purposes of clarity) and "T" means the Tag bits from the address of the memory block for the indexing mode. In the example for illustrating thrashing of cache lines, it is noted that, when the cache tried to store the memory block in one of the 8 ways in set 26, it find that none of the ways are empty. So, the cache needs to evict one cache line to make way for the new memory block. When the evicted cache line is needed later, then it will be a miss.

It will be understood that, the higher the associativity, the less conflict misses the memory blocks will suffer. On the other hand, the more ways the cache has, the bigger the way multiplexer becomes, and this may affect the cycle time of the processor. Hit ratio in various caches is the heart of the performance of a processor. Additionally, conflict misses also lead to poorer capacity utilization of a cache. For example, empty ways in other sets remain unused while conflicting cache lines are evicted from a set.

Various example embodiments presented herein for supporting a multi-mode indexed cache may be configured to improve cache performance (and, thus, processor performance) by improving the hit ratio of the cache and the utilization of the cache. Various example embodiments presented herein for supporting a multi-mode indexed cache may be configured to reduce or prevent conflict misses without requiring an extra cache and/or extra circuitry which consumes additional power and area on the processor die and which requires extra lookups in the extra cache/circuitry in the case of thrashing of cache lines.

Various example embodiments presented herein may be configured to reduce or minimize conflict misses in an N-way set associative cache by dynamically adjusting the indexing mode of the cache so that Q remains less than N for a working set (i.e., memory blocks accessed during program execution). Various example embodiments presented herein may be configured to reduce or minimize conflict misses in an N-way set associative cache by dynamically adjusting the indexing mode of the N-way set associative cache based on configuration of the N-way set associative cache as a multi-mode indexed cache configured to support multiple modes of indexing a memory block. In a multi-mode indexed cache, depending on the indexing mode used, a memory block can get stored in a different cache line. This may be used to guarantee that, for a memory block, each indexing mode selects a different set in the N-way set associative cache. For example, each indexing mode can use a disjoint subset of bits from the memory block address to select the set in the N-way set associative cache.

In a multi-mode indexed cache, the multiple modes may be used to support storage of a memory block as follows. To store a memory block, a first indexing mode is used and, accordingly, a first set of the N-way set associative cache is selected. If an empty cache line is available in the first set of the N-way set associative cache, then the memory block is stored in one of the empty cache lines in the first set. If no empty cache line is available in the first set of the N-way set associative cache, then a second indexing mode is used and, accordingly, a second set of the N-way set associative cache is selected. If an empty cache line is available in the first set of the N-way set associative cache, then the memory block is stored in one of the empty cache lines in the first set. If no empty cache line is available in the second set of the N-way set associative cache then a third indexing mode, if available, may be used. Theoretically, the cache may support up to S number of modes where S is the number of sets in the cache; however, given that cache performance demands limiting the number of clock cycles for various cache operations, there may be an upper limit to the number of indexing modes supported. For simplicity and without loss of generality, various example embodiments presented herein are primarily described within the context of a dual-mode indexed cache supporting two indexing modes (which, in many cases, may be sufficient since it can multiply the hit ratio of the cache by a factor of two); however, it will be appreciated that a larger number of modes may be supported by a multi-mode indexed cache.

The operation of a multi-mode indexed cache may be further understood with respect to the following example.

Figure 8:
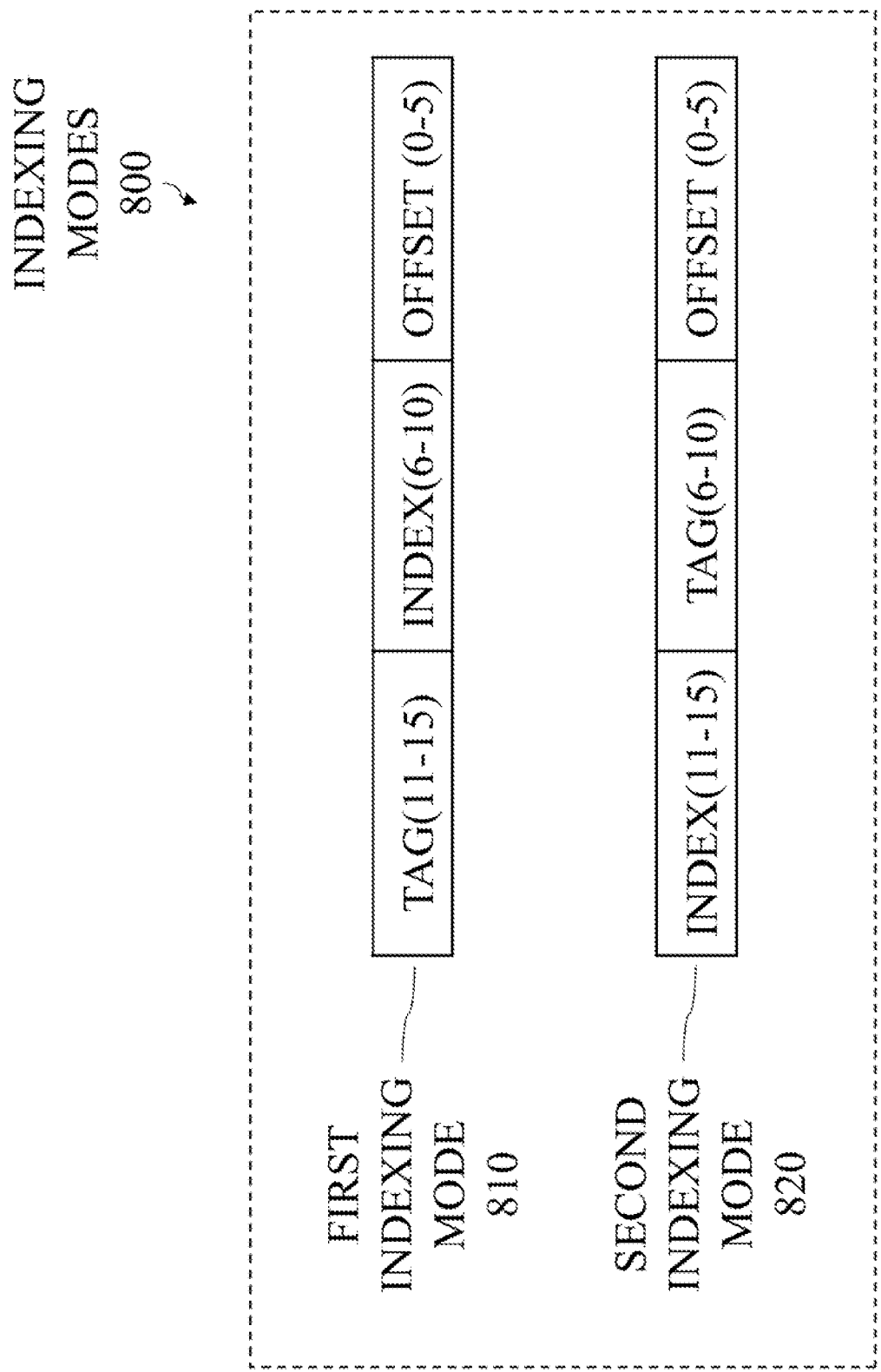
FIG. 8 depicts example embodiments of a pair of indexing modes for mapping an address of a memory block into a multi-mode indexed cache.

As an example, assume that a 16-bit memory block with address 1011011010010101 needs to be stored in a multi-mode indexed cache. Here, it is noted that the bit positions start from 0 to higher from right to left. In this example, assume that the multi-mode indexed cache is an 8-way set associative cache having 32 sets and where the size of each cache line is 64 B. In this example, further assume that the multi-mode indexed cache supports two modes of indexing memory blocks, which are illustrated in FIG. 8. In FIG. 8, a set of indexing modes 800 includes a first indexing mode 810 (also denoted as Mode-1) and a second indexing mode 820 (also denoted as Mode-2). In both the first indexing mode 810 and the second indexing mode 820, bits 0-5 are used for indexing an offset in a cache line. It is noted that Offset bit positions are the same across the modes since those 6 bits indicate the offset in a 64 B cache line. In the first indexing mode 810, bits 6-10 are used for indexing one of the 32 sets in the cache and bits 11-15 are used as the Tag. In the second indexing mode 820, bits 11-15 are used for indexing one of the 32 sets in the cache and bits 6-10 are used as the Tag. It will be appreciated that, since the two indexing modes use disjoint set of bits to select a set in the multi-mode indexed cache, it is likely that an address will select disjoint sets for the two indexing modes.

In this example, assume that the multi-mode indexed cache attempts to store the memory block with the 16-bit address (i.e., 1011011010010101) using mode-1. In mode-1, the address is partitioned as shown in FIG. 9. Namely, as illustrated in FIG. 9, the memory address partitioning 900 based on the first indexing mode (mode-1) is such that: (a) Offset(0-5)=010101, (b) Index(6-10)=11010, and (c) Tag (11-15)=10110.

In this example, the set is determined by the Index bits 11010, which maps to set 26. Here, assume that the current state of the multi-mode indexed cache is as shown in FIG. 10. Namely, as illustrated in FIG. 10, the multi-mode indexed cache state 1000 is such that certain ways are occupied while others are empty. As illustrated in FIG. 10, each cache line stores the indication in its metadata about the indexing mode used for the cache line to distinguish the bits from the address that is used as Tag. Here, "M" means the indexing mode and "T" means the Tag bits from the address of the memory block for the indexing mode.

In this example, when the multi-mode indexed cache attempts to store the memory block in one of the 8 ways in set 26 of the multi-mode indexed cache, the multi-mode indexed cache determines that none of the ways are empty. So, the multi-mode indexed cache, based on a determination that the attempt to store the memory block based on mode-1 was unsuccessful, will then attempt to store the memory block using mode-2.

In this example, the multi-mode indexed cache then attempts to store the memory block with the 16-bit address (i.e., 1011011010010101) using mode-2. In mode-2, the address is partitioned as shown in FIG. 11. Namely, as illustrated in FIG. 11, the memory address partitioning 1100 based on the second indexing mode (mode-2) is such that: (a) Offset(0-5)=010101, (b) Tag(6-10)=11010, and (c) Index (11-15)=10110.

In this example, the set is determined by the Index bits 10110, which maps to set 22. Here, assume that the current state of the multi-mode indexed cache is still as shown in FIG. 10, since the attempt to store the memory block based on mode-1 was unsuccessful. When the multi-mode indexed cache attempts to store the memory block in one of the 8 ways in set 22 of the multi-mode indexed cache, the multi-mode indexed cache determines that way 2 and way 3 of set 22 are empty.

In this example, the multi-mode indexed cache stores the memory block in way 2 based on mode-2. The new state of the multi-mode indexed cache is as shown in FIG. 12. Namely, as illustrated in FIG. 12, the multi-mode indexed cache state 1200 is such that way 2 of set 22 now stores the memory block, and the associated metadata is updated to indicate that the memory block was stored based on mode-2 (M=2) and the Tag bits from the address of the memory block for the indexing mode are "11010" (T=11010). It is noted that, since there were no additional modes available, if no empty ways were identified in set 22 then the multi-mode indexed cache could have evicted a valid cache line from set 22 in order to store the memory block.

It is noted that it is possible that, by coincidence, the Index bits in mode-1 and the Index bits in mode-2 may be exactly the same. Consider the address 1011010110010101, where bits 6-10 are 10110 and bits 11-15 also are 10110. In that case, both the indexing modes will map the address to the same set in the set associative cache. However, probabilistically, such collisions are expected to be quite rate. Further, the probability of such collisions reduces with an increase in the number of indexing modes.

Now, assume that, at some point, the exemplary address needs to be looked up in the cache. First, the cache needs to determine whether mode-1 or mode-2 should be used to start the lookup. This decision as to which mode is used to start the look-up may be based on various rules (e.g., Most Frequency Used (MFU), Last Used (LU), or the like). In the MFU embodiment, for example, each time there is a hit in lookup of a cache line, a counter is incremented for the number of hits for the mode of the cache line and then the mode with the highest counter is used to start the lookup. In the LU embodiment, for example, the mode that was used for the previous successful lookup is recorded and used to start the lookup. It is noted that the various example embodiments of the MFU scheme may be further understood by way of reference to FIG. 10 and FIG. 12.

As depicted in FIG. 10 and FIG. 12, the cache maintains an MFU record in which the number of hits for each indexing mode is recorded. Assume, for example, that before storing the exemplary memory block, the hits for mode-1 and mode-2 were 20 and 10, respectively. Then, the memory block was stored using mode-2, so the number of hits for mode-2 in MFU record was incremented to 11.

Now, while looking up the address in the cache, mode-1 is used first since it has the highest number of hits (=20) in the MFU record. So, the address is mapped to set 26. Then, each of the ways of set 26 is searched for matching the Tag bits 11-15. If metadata of any way is marked as mode-2 then that way is ignored. Eventually, no matching cache line is found.

Next, the cache decides to lookup the memory block in the cache using mode-2. So, the address is mapped to set 22. Then, each of the ways of set 22 is searched for matching the Tag bits 6-10. If metadata of any way is marked as mode-1 then that way is ignored. Eventually, the cache line is found in way-2 in set 22.

Now, assume that a lookup of an address in a set requires C cycles and the cache supports M indexing modes. In that case, lookup of an address in the cache may require at the maximum M×C clock cycles (although if the address is a hit in the first set then it requires only C cycles). In the example, above it required 2×C cycles to lookup the exemplary address.

It will be appreciated that, although primarily presented with respect to example embodiments in which a lookup is performed in the M modes serially, in at least some example embodiments a lookup may be performed in the M modes in parallel or a lookup may be performed in the M modes using a combination of serial and parallel lookups (e.g., performing an initial lookup using the MFU mode or the LU mode and, if the initial lookup is not a hit then performing the lookups in the remaining modes in parallel). It will be appreciated that parallel lookups may be used if the additional power consumption due to parallel lookup is insignificant. Since each indexing mode selects a disjoint set, so parallel lookup among all M sets is possible and each lookup can be performed in C cycles.

Figure 13:
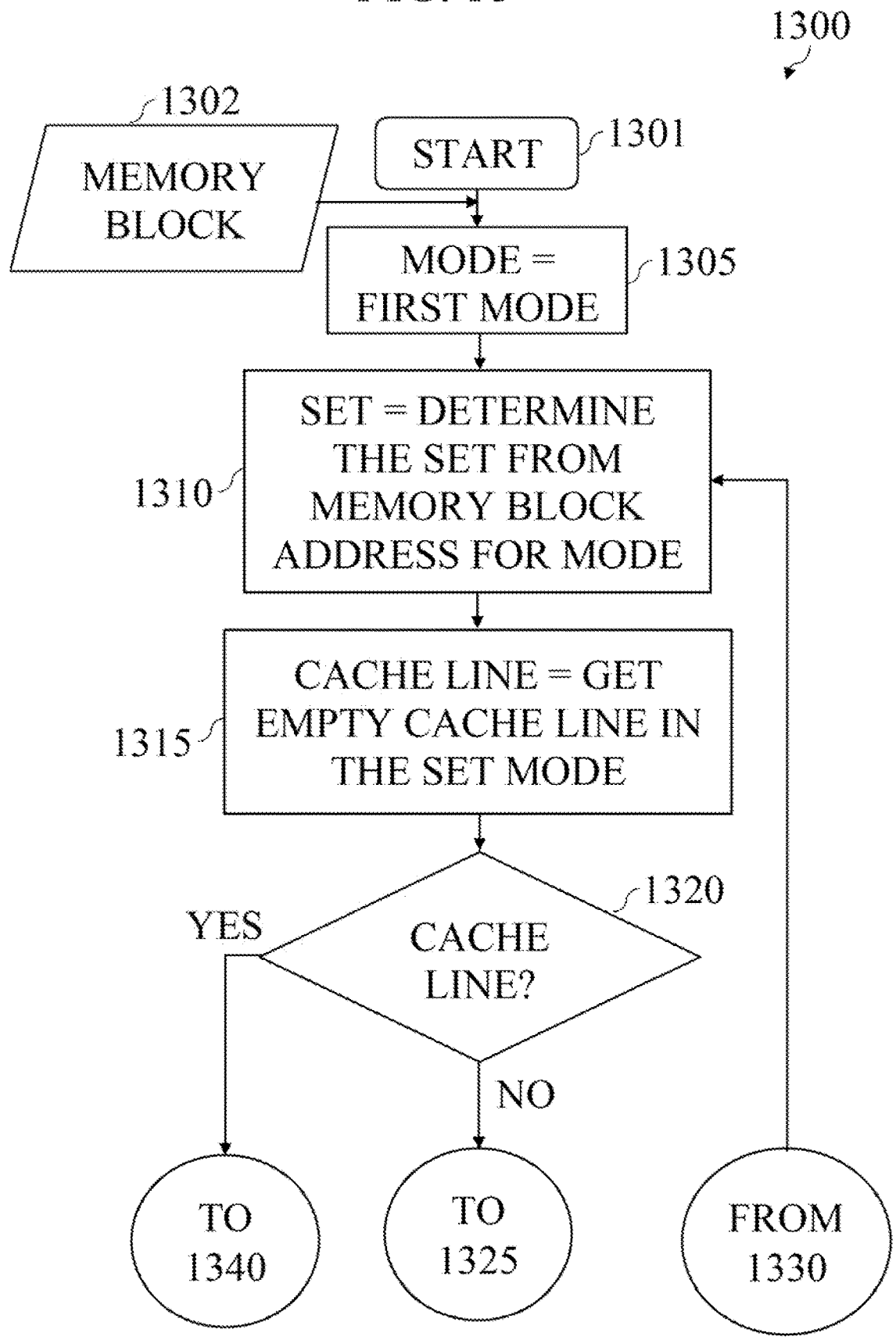
FIG. 13 depicts an example embodiment of method for storing a memory block into a multi-mode indexed cache.
Figure 13:
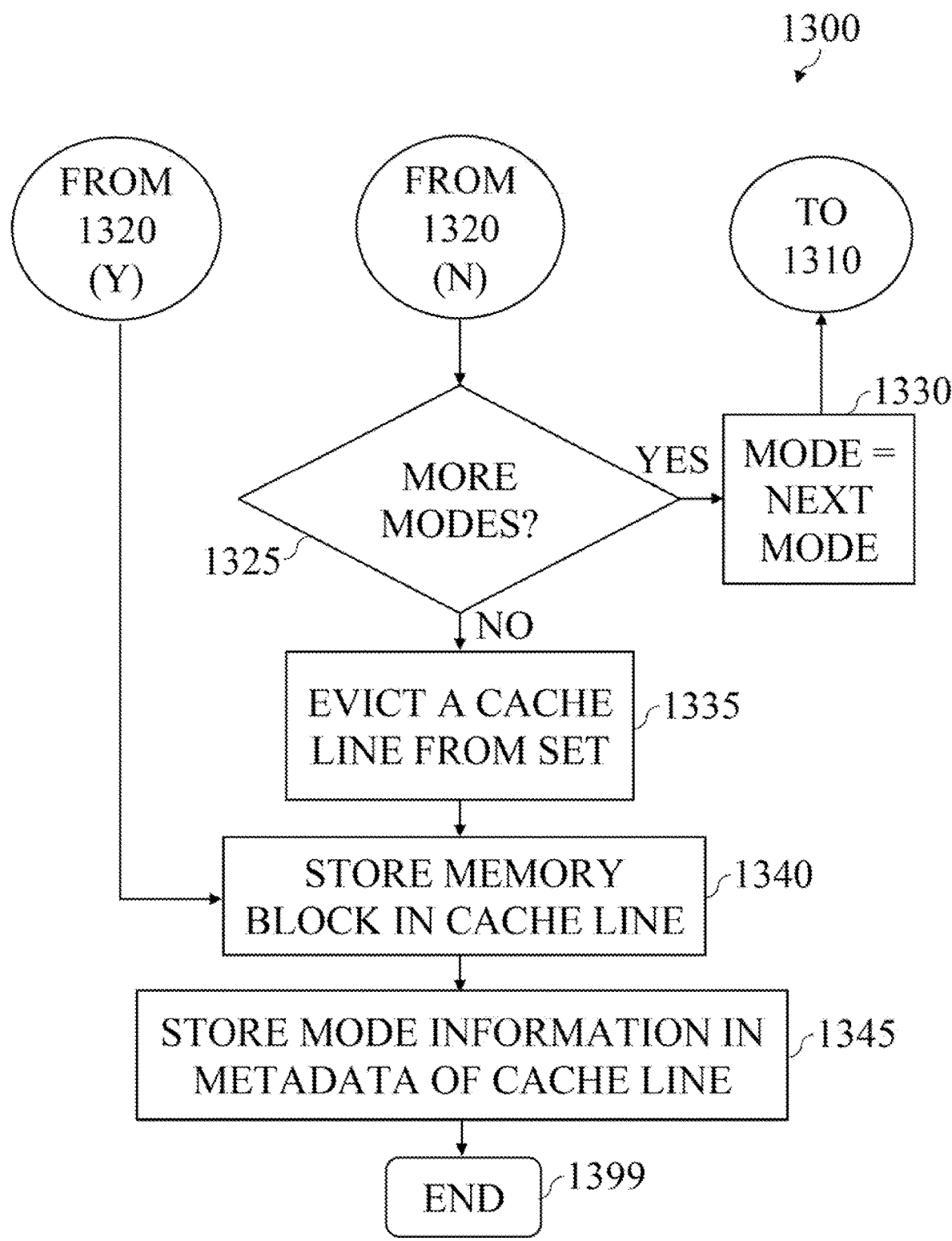

FIG. 13 depicts an example embodiment of method for storing a memory block into a multi-mode indexed cache. It will be appreciated that, although primarily presented herein as being performed serially, at least a portion of the functions of method 1300 may be performed contemporaneously or in a different order than as presented in FIG. 13. At block 1301, the method 1300 begins. As indicated by block 1302, the input to method 1300 is a memory block to be stored in the cache. Block 1305 retrieves the first indexing mode supported by the cache, and then the method 1300 proceeds to block 1310. Block 1310 determines the set for the address based on the selected mode, and then the method 1300 proceeds to block 1315. Block 1315 searches for an empty cache line in the set, and then the method 1300 proceeds to block 1320. Block 1320 checks if an empty cache line is found. If an empty cache line is not found then the method 1300 proceeds to block 1325, otherwise the method 1300 proceeds to block 1340. Block 1325 checks if the cache supports more indexing modes. If the cache supports more indexing modes then the method 1300 proceeds to block 1330, otherwise the method 1300 proceeds to block 1335. Block 1330 retrieves the next indexing mode supported by the cache, and then the method 1300 returns to block 1310 to repeat subsequent blocks for the next indexing mode. Block 1335, which when reached means that no empty cache line is found in the sets selected by all of the supported indexing modes, evicts a valid cache line in the set selected by the last indexing mode, and then the method 1300 proceeds to block 1340. Block 1340 stores the memory block in the empty cache line, and then the method 1300 proceeds to block 1345. Block 1345 stores, into the metadata of the cache line, the indexing mode used to store the memory block in the cache line. At block 1399, the method 1300 ends.

Figure 14:
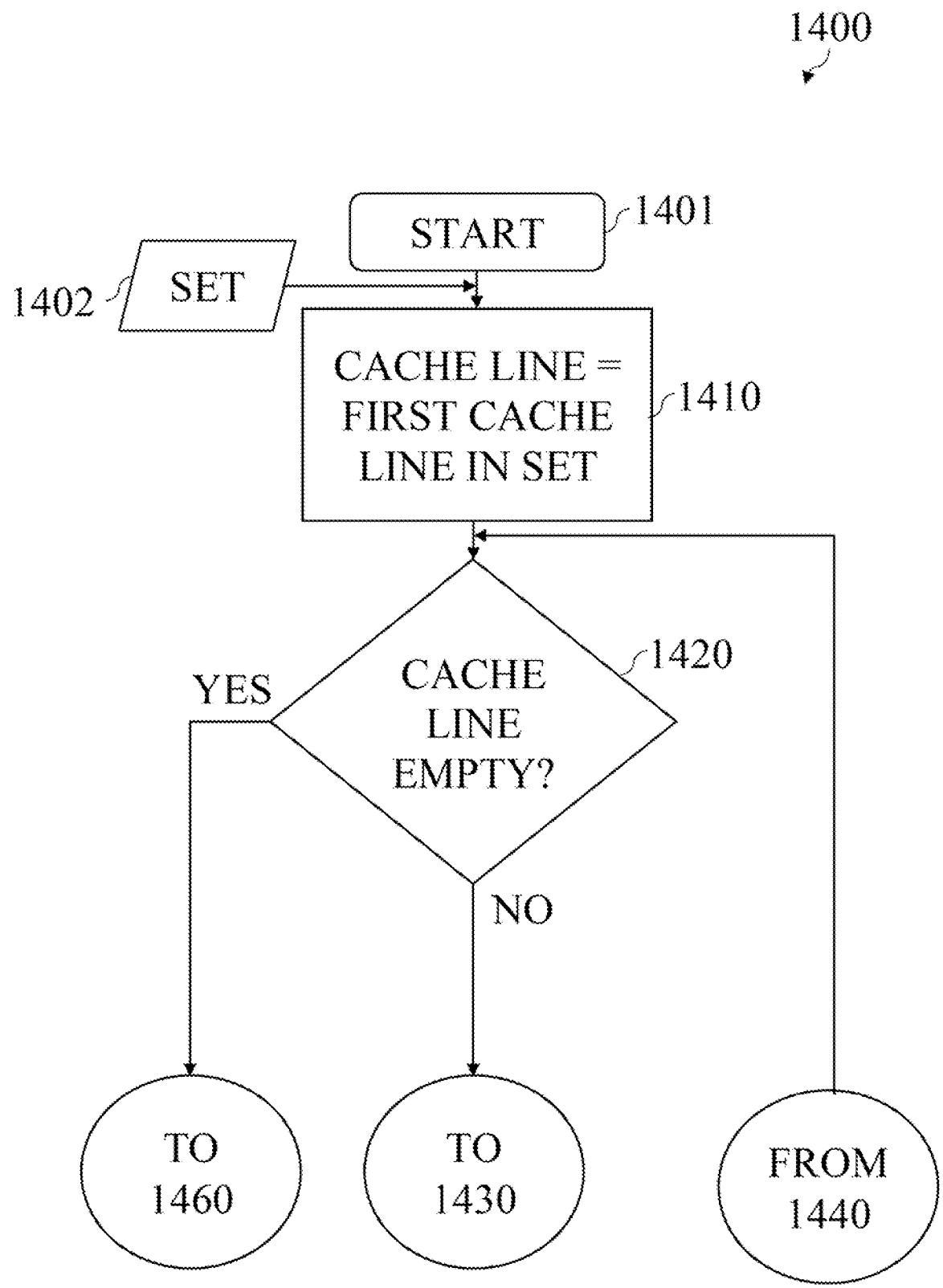
FIG. 14 depicts an example embodiment of a method for finding an empty cache line in a set of a multi-mode indexed cache.

FIG. 14 depicts an example embodiment of a method for finding an empty cache line in a set of a multi-mode indexed cache. It will be appreciated that the method 1400 may be used to provide block 1315 of the method 1300 of FIG. 13. It will be appreciated that, although primarily presented herein as being performed serially, at least a portion of the functions of method 1400 may be performed contemporaneously or in a different order than as presented in FIG. 14. As indicated by block 1402, the input to method 1400 is a set in the cache. Block 1410 retrieves the first cache line in the set, and then the method 1400 proceeds to block 1420. Block 1420 checks if the cache line is empty. If the cache line is not empty then the method 1400 proceeds to block 1430, otherwise the method 1400 proceeds to block 1450. Block 1430 checks if there are more cache lines in the set. If there are more cache lines in the set then the method 1400 proceeds to block 1440, otherwise the method 1400 proceeds to block 1460. Block 1440 retrieves the next cache line in the set and then the method 1400 returns to block 1420 to repeat subsequent blocks for the next cache line. Block 1450 returns the empty cache line and then the method 1400 proceeds to block 1499 where the method 1400 ends. Block 1460 declares that no empty cache line is found in the set and then the method 1400 proceeds to block 1499, where the method 1400 ends. At block 1499, the method 1400 ends.

Figure 15:
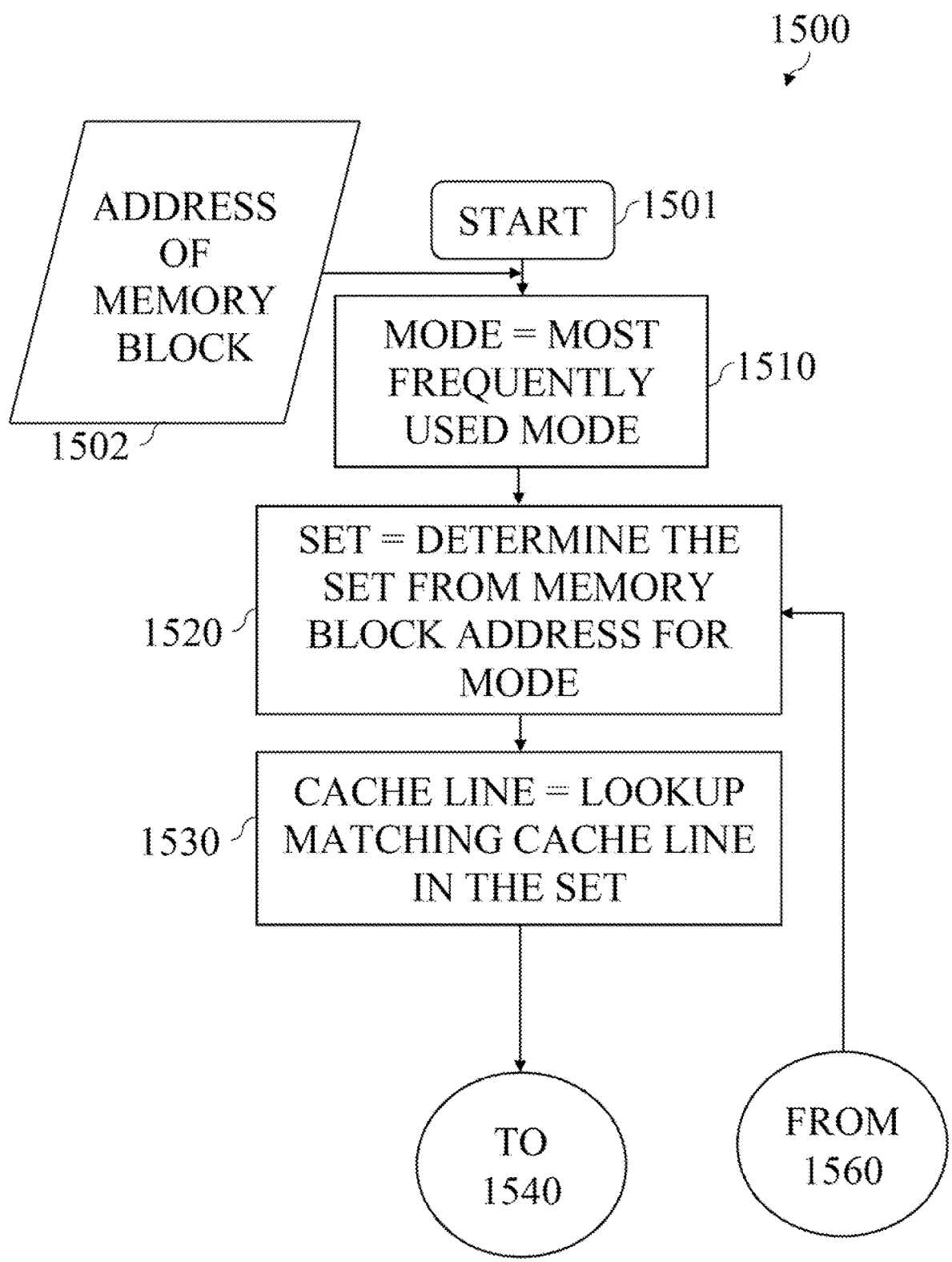
FIG. 15 depicts an example embodiment of method for looking up a memory block in a multi-mode indexed cache.
Figure 15:
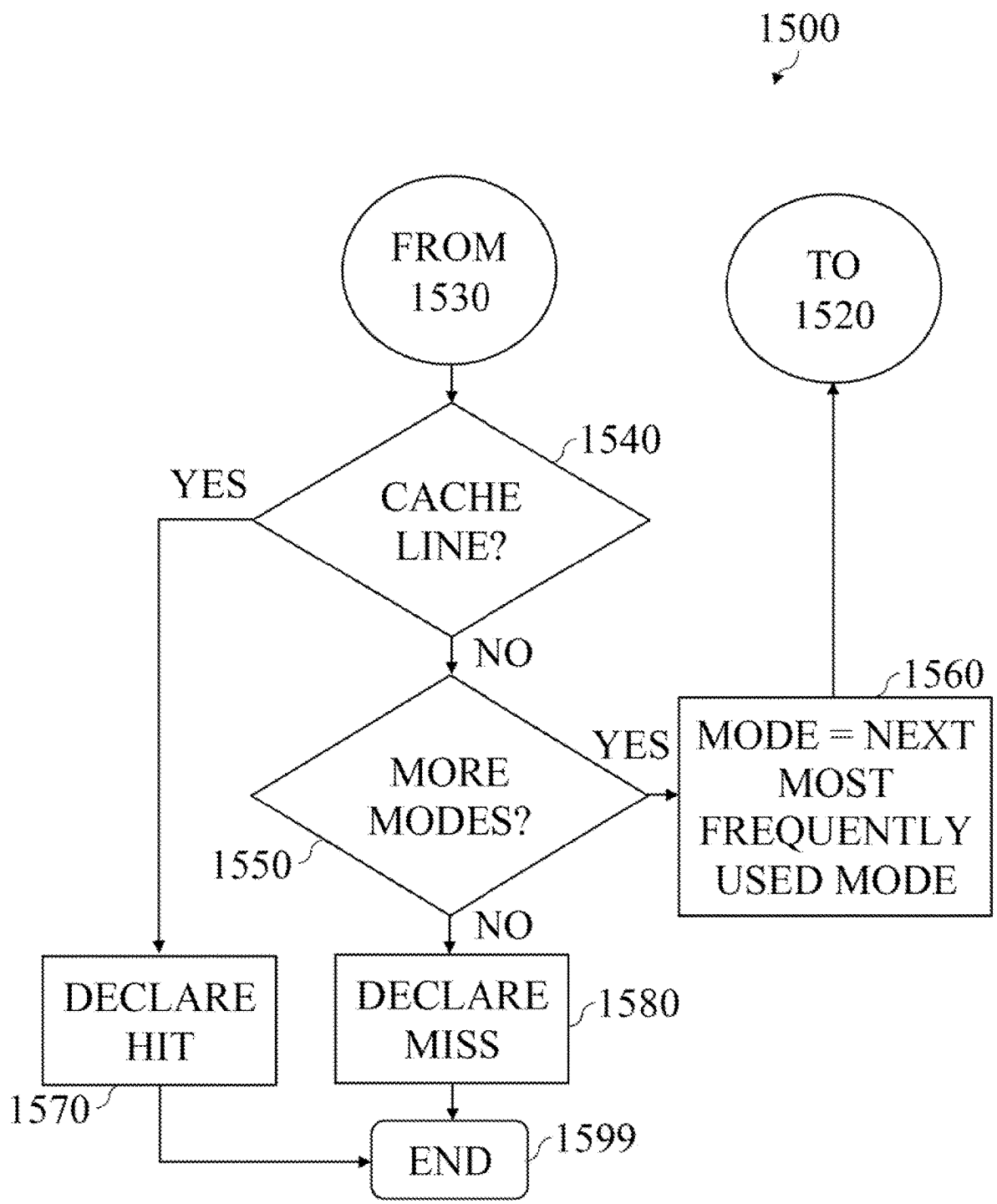

FIG. 15 depicts an example embodiment of method for looking up a memory block in a multi-mode indexed cache. It will be appreciated that, although primarily presented herein as being performed serially, at least a portion of the functions of method 1500 may be performed contemporaneously or in a different order than as presented in FIG. 15. At block 1501, the method 1500 begins. As indicated by block 1502, the input to method 1500 is an address of a memory block to be looked up in the cache. Block 1510 determines the mode to start with for looking up the memory block. This method assumes that the MFU scheme is used to determine the mode to start with; however it will be appreciated that the initial mode may be selected in various other ways. From block 1510, the method 1500 proceeds to block 1520. Block 1520 determines the set for the address as mapped by the mode, and then the method 1500 proceeds to block 1530. Block 1530 looks up the cache line in the set that matches the tag bits of the address as per the selected mode, and then the method 1500 proceeds to block 1540. Block 1540 checks if matching cache line is found. If the matching cache line is not found then the method 1500 proceeds to block 1550, otherwise the method 1500 proceeds to block 1570. Block 1550 checks if there are more modes to try. If there are more modes to try then the method 1500 proceeds to block 1560, otherwise the method 1500 proceeds to block 1580. Block 1560 retrieves the next MFU mode and then the method 1500 returns to block 1520 to repeat subsequent blocks for the next mode. Block 1570 declares a hit and then the method 1500 proceeds to block 1599 where the method 1500 ends. Block 1580 declares a miss and then the method 1500 proceeds to block 1599 where the method 1500 ends. At block 1599, the method 1500 ends.

Figure 16:
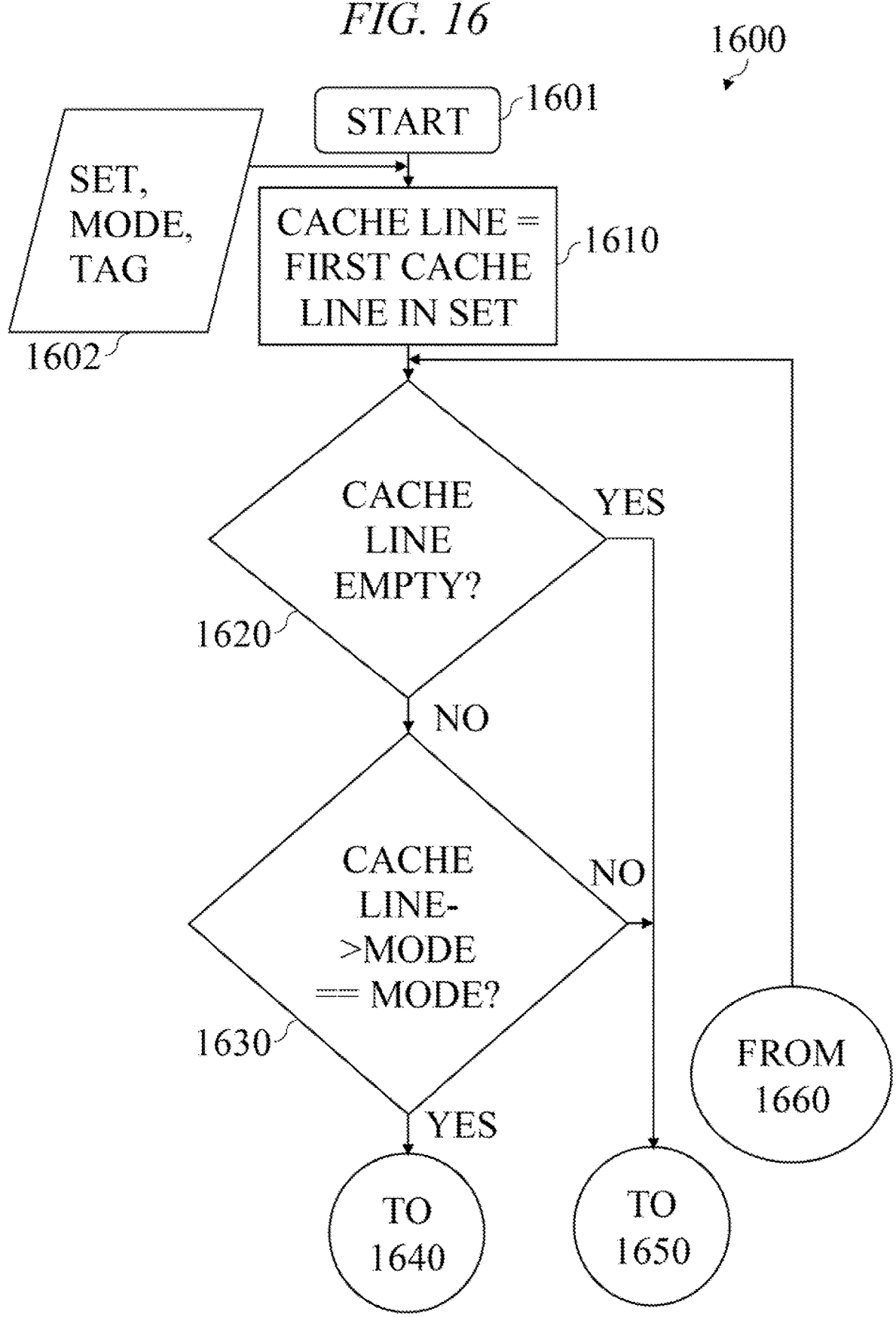
FIG. 16 depicts an example embodiment of a method for finding a matching cache line in a set of a multi-mode indexed cache.
Figure 16:
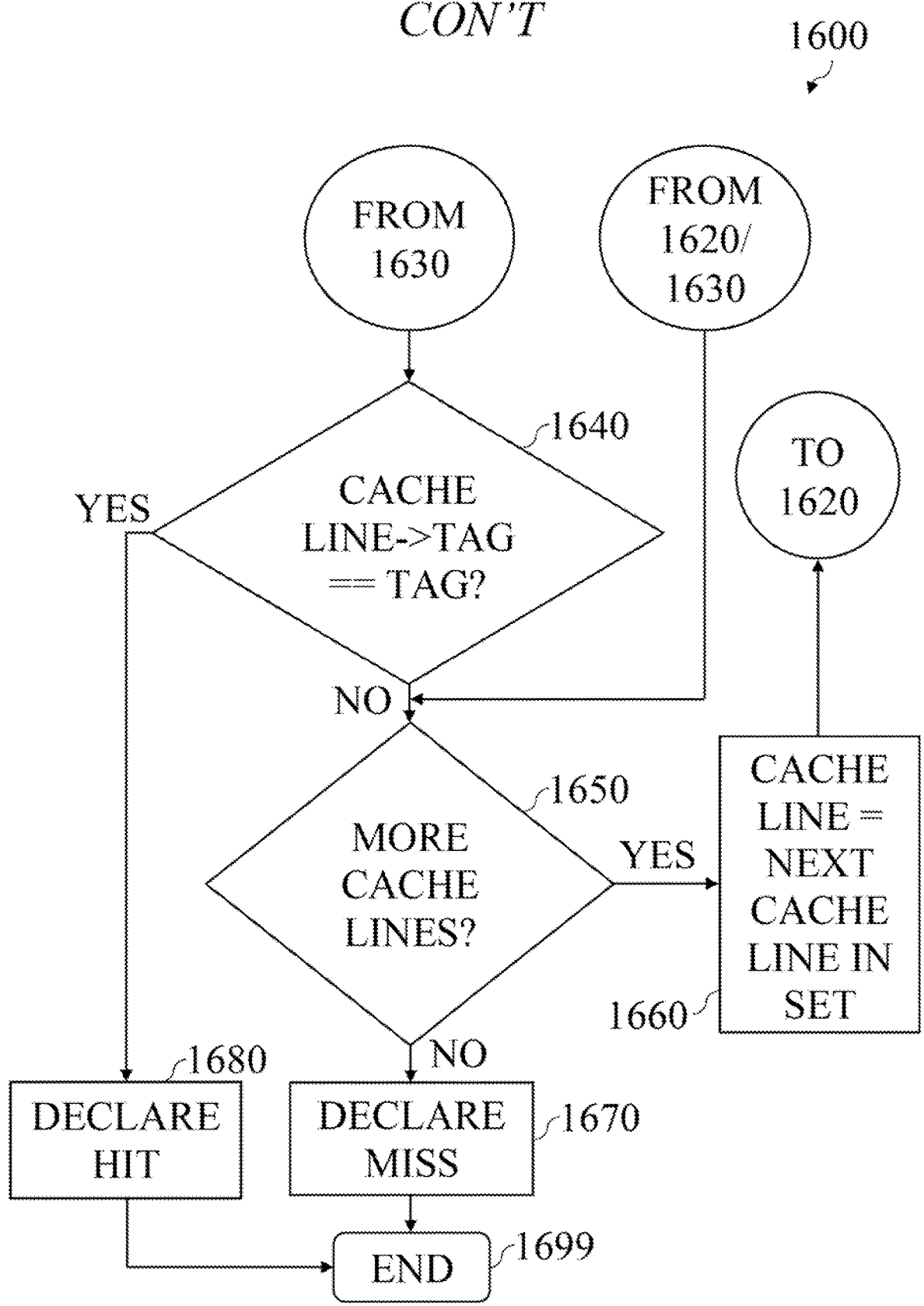

FIG. 16 depicts an example embodiment of a method for finding a matching cache line in a set of a multi-mode indexed cache. It will be appreciated that, although primarily presented herein as being performed serially, at least a portion of the functions of method 1600 may be performed contemporaneously or in a different order than as presented in FIG. 16. It will be appreciated that the method 1600 may be used to implement block 1530 of the method 1500 of FIG. 15. At block 1601, the method 1600 begins. As indicated by block 1602, the inputs to the method 1600 include: (1) the set in the cache to lookup the memory block, (2) the Indexing mode, and (3) Tag bits from the address of the memory block, as per the indexing mode. Block 1610 retrieves the first cache line in the set, and then the method 1600 proceeds to block 1620. Block 1620 checks if the cache line is empty. If the cache line is not empty then the method 1600 proceeds to block 1630, otherwise the method 1600 proceeds to block 1650. Block 1630 checks if the indexing mode of the cache line is the same as the input indexing mode (i.e., indexing mode used to search the tag bits). If the indexing mode of the cache line is the same as the input indexing mode then the method 1600 proceeds to block 1640, otherwise the method 1600 proceeds to block 1650. Block 1640 checks if the tag bits in the cache line are the same as the tag bits in the address of the memory block. If the tag bits in the cache line are the same as the tag bits in the address of the memory block then the method 1600 proceeds to block 1616, otherwise the method 1600 proceeds to block 1650. Block 1650 checks if there are more cache lines in the set. If there are more cache lines in the set then the method 1600 proceeds to block 1660, otherwise the method 1600 proceeds to block 1670. Block 1660 retrieves the next cache line in the set and then the method 1600 returns to block 1620 to repeat subsequent blocks for the next cache line. Block 1670 declares a miss and then the method 1600 proceeds to block 1699 where the method 1600 ends. Block 1680 declares a hit and then the method 1600 proceeds to block 1699 where the method 1600 ends. At block 1699, the method 1600 ends.

Figure 17:
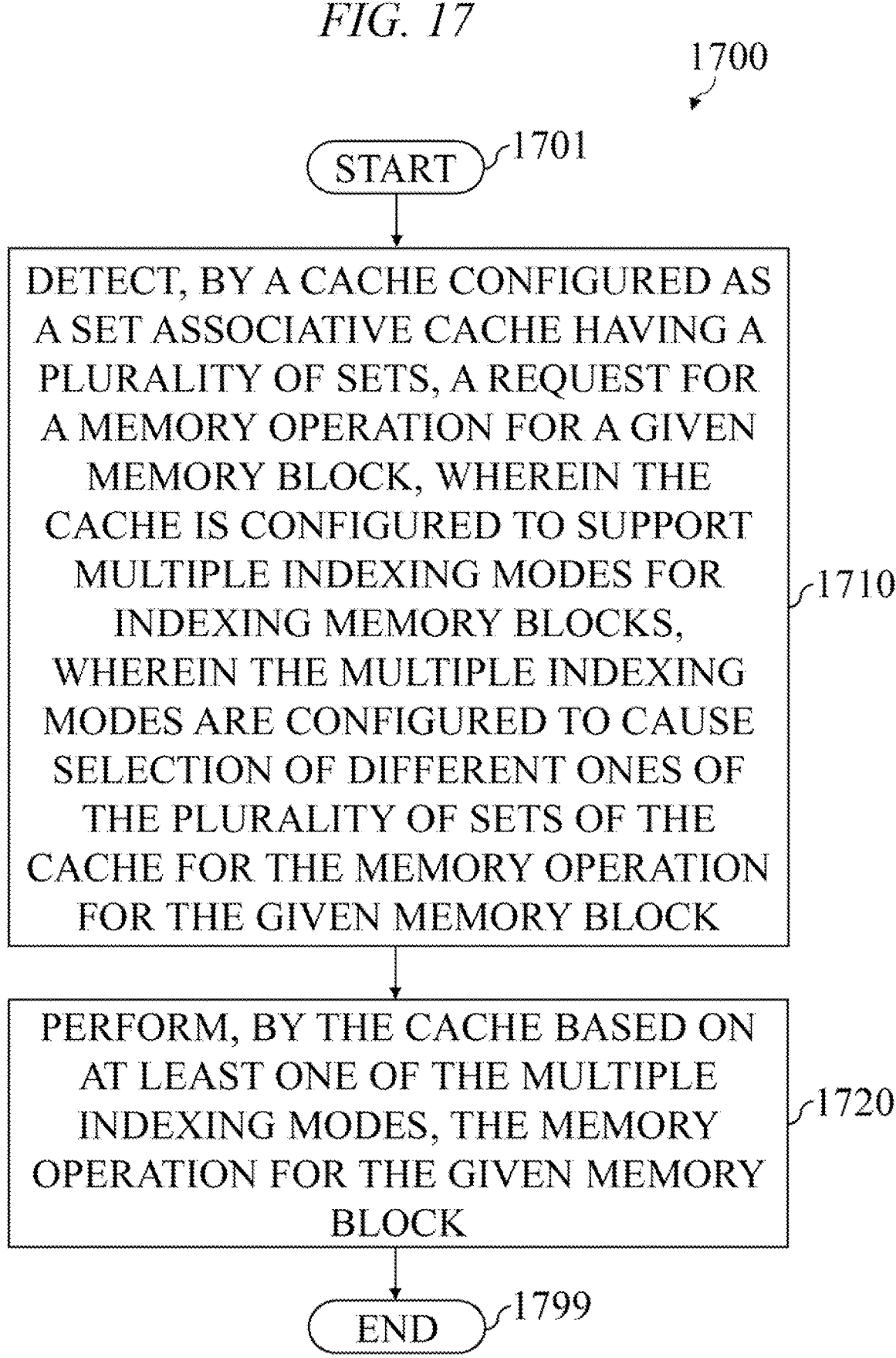
FIG. 17 depicts an example embodiment of a method for operating a multi-mode indexed cache.

FIG. 17 depicts an example embodiment of a method for operating a multi-mode indexed cache. It will be appreciated that, although primarily presented herein as being performed serially, at least a portion of the functions of method 1700 may be performed contemporaneously or in a different order than as presented in FIG. 17. At block 1701, the method 1700 begins. At block 1710, detect, by a cache configured as a set associative cache having a plurality of sets, a request for a memory operation for a given memory block, wherein the cache is configured to support multiple indexing modes for indexing memory blocks, wherein the multiple indexing modes are configured to cause selection of different ones of the plurality of sets of the cache for the memory operation for the given memory block. At block 1720, perform, by the cache based on at least one of the multiple indexing modes, the memory operation for the given memory block. At block 1799, the method 1700 ends.

Figure 18:
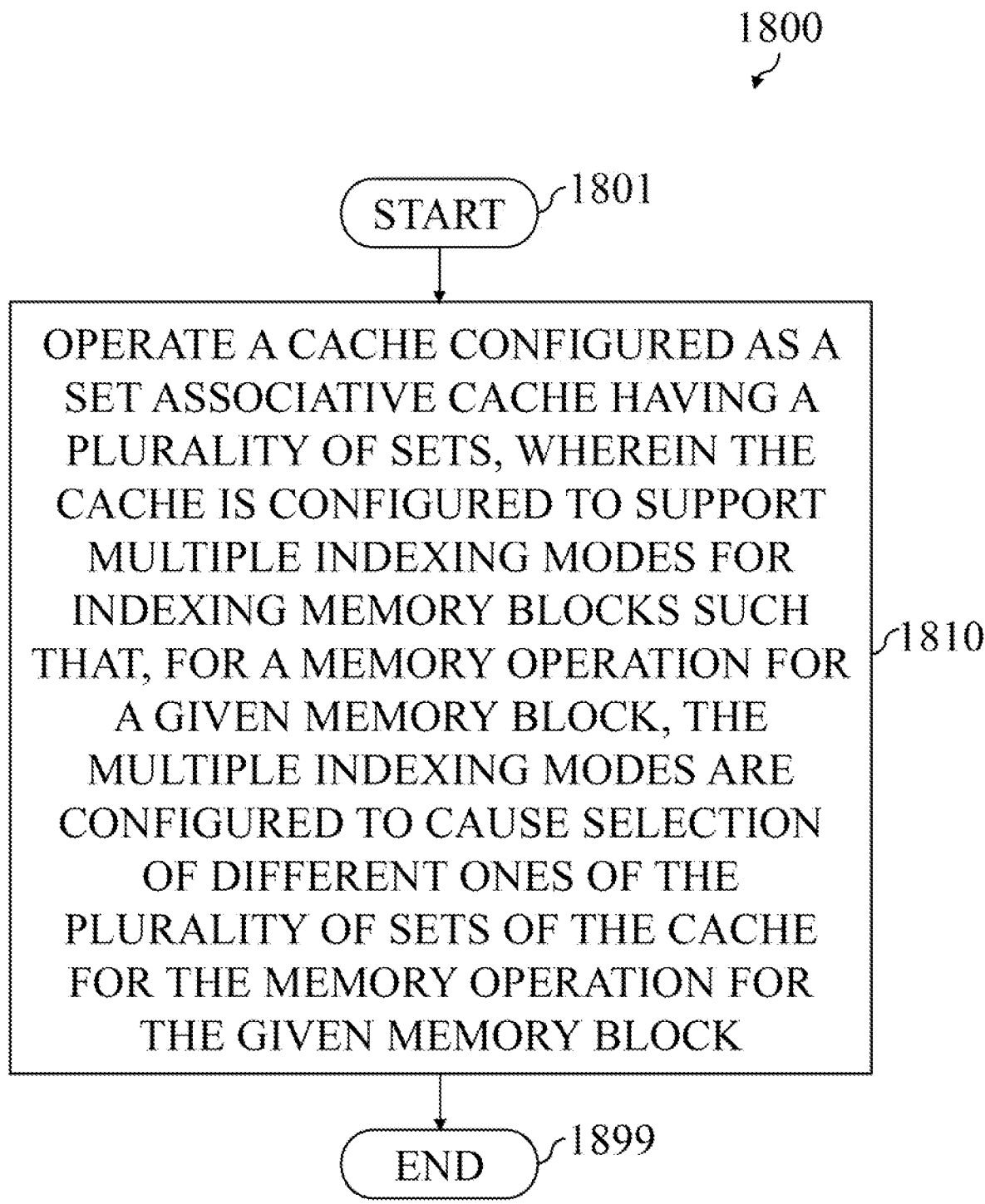
FIG. 18 depicts an example embodiment of a method for operating a multi-mode indexed cache.

FIG. 18 depicts an example embodiment of a method for operating a multi-mode indexed cache. It will be appreciated that, although primarily presented herein as being performed serially, at least a portion of the functions of method 1800 may be performed contemporaneously or in a different order than as presented in FIG. 18. At block 1801, the method 1800 begins. At block 1810, operate a cache configured as a set associative cache having a plurality of sets, wherein the cache is configured to support multiple indexing modes for indexing memory blocks such that, for a memory operation for a given memory block, the multiple indexing modes are configured to cause selection of different ones of the plurality of sets of the cache for the memory operation for the given memory block. At block 1899, the method 1800 ends.

Various example embodiments for providing a multi-mode indexed cache for a processor may be configured to be applied to various types of caches which may be implemented within or otherwise operate in association with processors, such as an instruction cache (IC) of a processor, a micro-operations cache (UC) of a processor, a data cache (DC) of a processor, a unified cache of a processor that can host instructions and data, a branch target buffer (BTB) associated with a branch predictor of a processor, or the like.

Various example embodiments for providing a multi-mode indexed cache for a processor may be configured to be used within various types of processors which may utilize caches, such as Complex Instruction Set Computer (CISC) processors, Reduced Instruction Set Computer (RISC) processors, or any other types of processors or other devices which may utilize caches.

Various example embodiments for providing a multi-mode indexed cache for a processor may provide various advantages or potential advantages. For example, various example embodiments for providing a multi-mode indexed cache for a processor may be configured to minimize conflict misses in a cache by dynamically adjusting the indexing mode of the cache so that Q remains less than N for a working set (i.e., memory blocks accessed during program execution). For example, various example embodiments for providing a multi-mode indexed cache for a processor may be configured to obviate the need for use of a victim cache (e.g., whether it is a supplementary cache or an existing next-level cache), which is used to store evicted cache lines (i.e., victims) and looked up in the case of a cache miss so that recently evicted cache lines can be brought back into the cache, thereby obviating the need for performing additional lookups in the supplementary cache that consume additional clock cycles on the processor and, in the case where a supplementary cache is to be used as the victim cache, obviating the need for use of additional circuitry that consumes power and area on the processor die. Various example embodiments for providing a multi-mode indexed cache for a processor may provide various other advantages or potential advantages.

Figure 19:
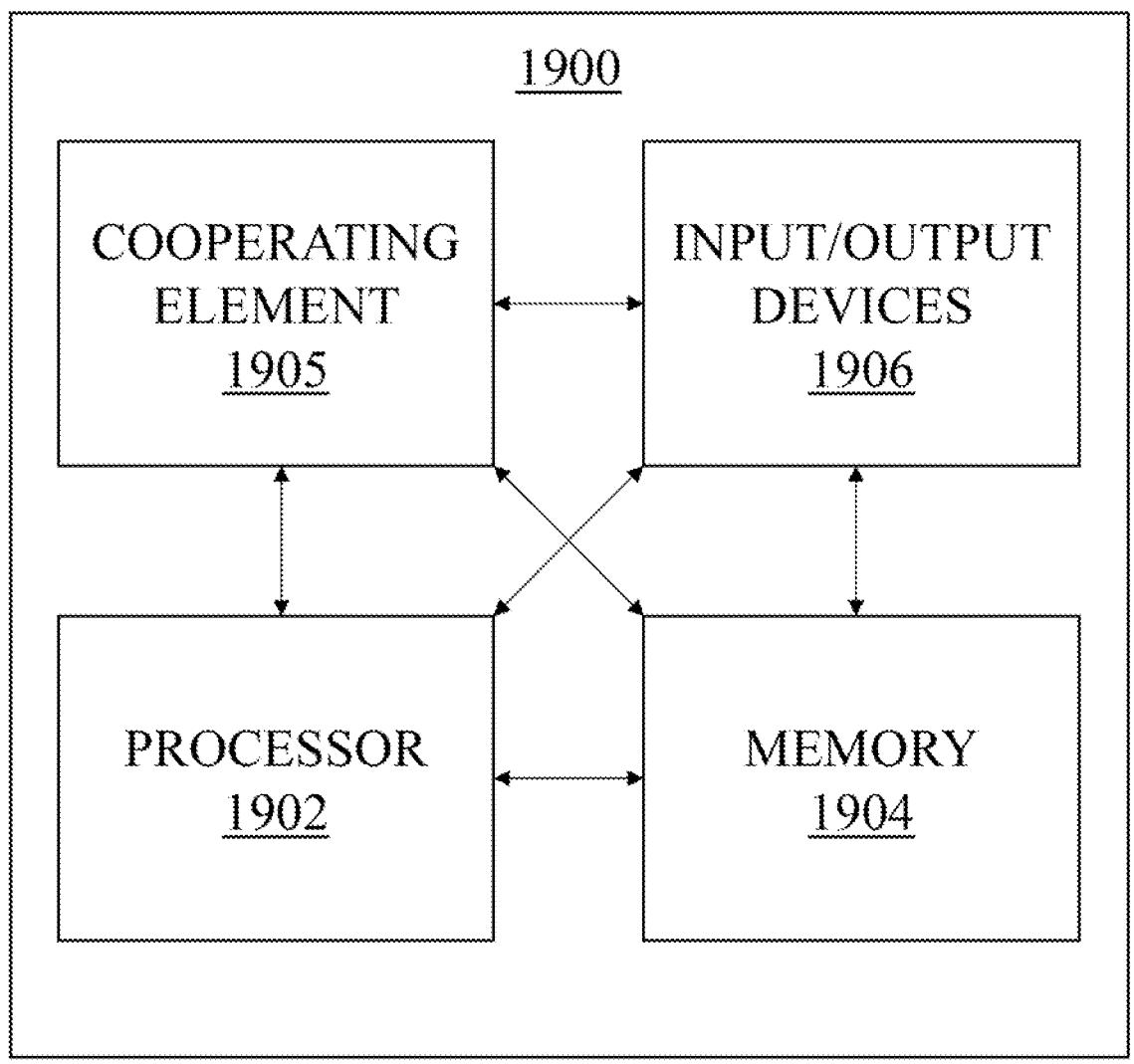
FIG. 19 depicts an example embodiment of a computer suitable for use in performing various functions presented herein.

FIG. 19 depicts an example embodiment of a computer suitable for use in performing various functions presented herein.

The computer 1900 includes a processor 1902 (e.g., a central processing unit (CPU), a processor, a processor having a set of processor cores, a processor core of a processor, or the like) and a memory 1904 (e.g., a random access memory (RAM), a read-only memory (ROM), or the like). In at least some example embodiments, the computer 1900 may include at least one processor and at least one memory storing instructions that, when executed by the at least one processor, cause the computer to perform various functions presented herein.

The computer 1900 also may include a cooperating element 1905. The cooperating element 1905 may be a hardware device. The cooperating element 1905 may be a process that can be loaded into the memory 1904 and executed by the processor 1902 to implement various functions presented herein (in which case, for example, the cooperating element 1905 (including associated data structures) can be stored on a non-transitory computer readable medium, such as a storage device or other suitable type of storage element (e.g., a magnetic drive, an optical drive, or the like)).

The computer 1900 also may include one or more input/output devices 1906. The input/output devices 1906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1900 may represent a general architecture and functionality suitable for implementing functional elements described herein, portions of functional elements described herein, or the like, as well as various combinations thereof. For example, computer 1900 may provide a general architecture and functionality that is suitable for implementing one or more elements presented herein.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a cache configured as a set associative cache having a plurality of sets, wherein the cache is configured to support multiple indexing modes for indexing memory blocks such that, for a memory operation for a given memory block, the multiple indexing modes are configured to cause selection of different ones of the plurality of sets of the cache for the memory operation for the given memory block, wherein the multiple indexing modes are configured to use disjoint subsets of bits of a memory block address of the given memory block to cause selection of the different ones of the plurality of sets of the cache for the memory operation for the given memory block.

2. The apparatus of claim 1, wherein the memory block address includes a first set of bits and a second set of bits, wherein a first indexing mode of the multiple indexing modes uses the first set of bits to index into the plurality of sets of the cache and a second indexing mode of the multiple indexing modes uses the second set of bits to index into the plurality of sets of the cache.

3. The apparatus of claim 2, wherein the memory block address includes a third set of bits, wherein the third set of bits is an offset into a cache line within a selected one of the plurality of sets of the cache.

4. The apparatus of claim 1, wherein the cache is configured as an N-way set associative cache having N ways, wherein the memory block address includes a first set of bits and a second set of bits, wherein a first indexing mode of the multiple indexing modes uses a first subset of bits from the first set of bits to index into the plurality of sets of the cache and a second indexing mode of the multiple indexing modes uses a second subset of bits from first set of bits to index into the plurality of sets of the cache, wherein the second set of bits is used to identify one of the N ways within a selected one of the plurality of sets of the cache.

5. The apparatus of claim 1, wherein the cache is configured to:
select, from the multiple indexing modes, a first indexing mode for the memory operation for the given memory block; and
select, from the multiple indexing modes based on a determination that the memory operation for the given memory block is not completed using the first indexing mode, a second indexing mode for the memory operation for the given memory block.

6. The apparatus of claim 1, wherein the cache is configured to:
select, from the multiple indexing modes, a selected indexing mode for the memory operation for the given memory block;
select, based on the selected indexing mode, a selected one of the plurality of sets of the cache; and
perform, based on the selected one of the plurality of sets of the cache, the memory operation for the given memory block.

7. The apparatus of claim 6, wherein the memory operation is a write operation, wherein the selected indexing mode is selected from the multiple indexing modes randomly or in a round robin manner.

8. The apparatus of claim 6, wherein the memory operation is a read operation, wherein the selected indexing mode is a most frequently used indexing mode of the multiple indexing modes.

9. The apparatus of claim 8, wherein the most frequently used indexing mode of the multiple indexing modes is determined based on metadata indicative of respective frequencies with which the multiple indexing modes have been used for writing into the cache.

10. The apparatus of claim 6, wherein the memory operation is a write operation, wherein, to perform the write operation for the given memory block, the cache is configured to:
store, in a cache line of the selected one of the plurality of sets of the cache based on a determination that the cache line of the selected one of the plurality of sets of the cache is empty, the given memory block.

11. The apparatus of claim 10, wherein the cache is configured to:
store, within metadata of the cache, an indication of the selected indexing mode.

12. The apparatus of claim 6, wherein the memory operation is a write operation, wherein, to perform the write operation for the given memory block, the cache is configured to:
select, from the multiple indexing modes based on a determination that the selected one of the plurality of sets of the cache does not include an empty cache line, a next selected indexing mode;
select, based on the next selected indexing mode, a next selected one of the plurality of sets of the cache; and
perform, based on the next selected one of the plurality of sets of the cache, the write operation for the given memory block.

13. The apparatus of claim 6, wherein the memory operation is a write operation, wherein, to perform the write operation for the given memory block, the cache is configured to:
- determine, from the multiple indexing modes based on a determination that the selected one of the plurality of sets of the cache does not include an empty cache line, whether each of the multiple indexing modes has been selected for attempting to write the given memory block into the cache;
- evict, from the selected one of the plurality of sets of the cache based on a determination that each of the multiple indexing modes has been selected for attempting to write the given memory block into the cache, a cache line; and
- store, in the cache line, the given memory block.

14. The apparatus of claim 6, wherein the memory operation is a read operation, wherein, to perform the read operation for the given memory block, the cache is configured to:
- perform, in the selected one of the plurality of sets of the cache, a lookup for a matching cache line; and
- declare, based on a determination that the selected one of the plurality of sets of the cache includes a matching cache line, a hit for the given memory block in the selected one of the plurality of sets of the cache.

15. The apparatus of claim 6, wherein the memory operation is a read operation, wherein, to perform the read operation for the given memory block, the cache is configured to:
- select, from the multiple indexing modes based on a determination that a matching cache line is not found in the selected one of the plurality of sets of the cache, a next selected indexing mode;
- select, based on the next selected indexing mode, a next selected one of the plurality of sets of the cache; and
- perform, based on the next selected one of the plurality of sets of the cache, the read operation for the given memory block.

16. The apparatus of claim 6, wherein the memory operation is a read operation, wherein, to perform the read operation for the given memory block, the cache is configured to:
- determine, from the multiple indexing modes based on a determination that a matching cache line is not found in the selected one of the plurality of sets of the cache, whether each of the multiple indexing modes has been selected for attempting to read the given memory block from the cache; and
- declare, based on a determination that each of the multiple indexing modes has been selected for attempting to read the given memory block from the cache, a miss for the given memory block in the cache.

17. The apparatus of claim 1, wherein the cache comprises an instruction cache, a micro-operations cache, a data cache, a unified cache, or a branch target buffer.

18. The apparatus of claim 1, wherein the apparatus comprises a processor, wherein the processor is configured to initiate the memory operation for the given memory block.

19. A method, comprising:
- detecting, by a cache configured as a set associative cache having a plurality of sets, a request for a memory operation for a given memory block, wherein the cache is configured to support multiple indexing modes for indexing memory blocks, wherein the multiple indexing modes are configured to cause selection of different ones of the plurality of sets of the cache for the memory operation for the given memory block, wherein the multiple indexing modes are configured to use disjoint subsets of bits of a memory block address of the given memory block to cause selection of the different ones of the plurality of sets of the cache for the memory operation for the given memory block; and
- performing, by the cache based on at least one of the multiple indexing modes, the memory operation for the given memory block.

20. An apparatus, comprising:
- a cache configured as a set associative cache having a plurality of sets, wherein the cache is configured to support a memory operation for a memory block, wherein the memory block has a memory block address associated therewith, wherein the cache is configured to support a first indexing mode in which the cache uses a first subset of bits of the memory block address to index into the plurality of sets of the cache for the memory operation and a second indexing mode in which the cache uses a second subset of bits of the memory block address to index into the plurality of sets of the cache for the memory operation, wherein the first subset of bits of the memory block address and the second subset of bits of the memory block address are disjoint subsets of bits of the memory block address.

21. The apparatus of claim 20, wherein the cache is configured to:
- perform the memory operation for the memory block using one of the sets in the plurality of sets of the cache selected based on the first indexing mode.

22. The apparatus of claim 20, wherein the cache is configured to:
- determine that the memory operation for the memory block cannot be completed using a first set selected from the plurality of sets of the cache based on the first indexing mode; and
- perform the memory operation for the memory block using a second set selected from the plurality of sets of the cache based on the second indexing mode.

* * * * *